United States Patent
Sisson et al.

(10) Patent No.: US 9,879,112 B2
(45) Date of Patent: Jan. 30, 2018

(54) POLYMER NETWORK MATERIAL COMPRISING A POLY(GLYCIDYL ETHER) STRUCTURE, METHOD OF ITS PRODUCTION AND USE

(71) Applicant: Helmholtz-Zentrum Geesthacht Zentrum fuer Material- und Kuestenforschung GmbH, Geesthacht (DE)

(72) Inventors: Adam Sisson, Berlin (DE); Duygu Ekinci, Ankara (TR); Andreas Lendlein, Berlin (DE); Friedrich Alfons Jung, Dresden (DE); Nan Ma, Berlin (DE)

(73) Assignee: HELMHOLTZ-ZENTRUM GEESTHACHT ZENTRUM FUER MATERIAL—UND KUESTENFORSCHUNG GMBH, Geesthacht (DE)

( * ) Notice: Subject to any disclaimer, the term of this patent is extended or adjusted under 35 U.S.C. 154(b) by 0 days.

(21) Appl. No.: 14/408,489

(22) PCT Filed: Aug. 16, 2013

(86) PCT No.: PCT/EP2013/067145
§ 371 (c)(1),
(2) Date: Dec. 16, 2014

(87) PCT Pub. No.: WO2014/027090
PCT Pub. Date: Feb. 20, 2014

(65) Prior Publication Data
US 2015/0203627 A1    Jul. 23, 2015

(30) Foreign Application Priority Data

Aug. 17, 2012   (EP) .................................... 12180812
Dec. 17, 2012   (EP) .................................... 12197494

(51) Int. Cl.
*C08G 59/36*  (2006.01)
*C08G 59/32*  (2006.01)
(Continued)

(52) U.S. Cl.
CPC ............. *C08G 59/36* (2013.01); *C08G 59/32* (2013.01); *C08G 59/38* (2013.01); *C08J 9/26* (2013.01);
(Continued)

(58) Field of Classification Search
CPC .................................. C08G 59/36; C08J 9/26
(Continued)

(56) References Cited

U.S. PATENT DOCUMENTS 3,907,623 A * 9/1975 Dowbenko ....... B32B 17/10036
                                                  156/155
4,683,317 A * 7/1987 Crivello .................... C07F 9/68
                                                  522/15
(Continued)

FOREIGN PATENT DOCUMENTS

JP        2001002760 A  *  1/2001

OTHER PUBLICATIONS

Ba et al., "Study on epoxy network solid electrolytes," Makromol. Chem. 191, pp. 2829-2536 (1990). (hereinafter Ba).*
(Continued)

*Primary Examiner* — Randy Gulakowski
*Assistant Examiner* — Ha S Nguyen
(74) *Attorney, Agent, or Firm* — Fox Rothschild LLP

(57) ABSTRACT

The present invention is related to novel preparative methods to a novel class of polymer network materials with a highly branched poly(glycidyl ether) (PGE) structure. Said polymer networks are prepared by a simple procedure involving ring-opening polymerisation and the method is
(Continued)

Figure 1:
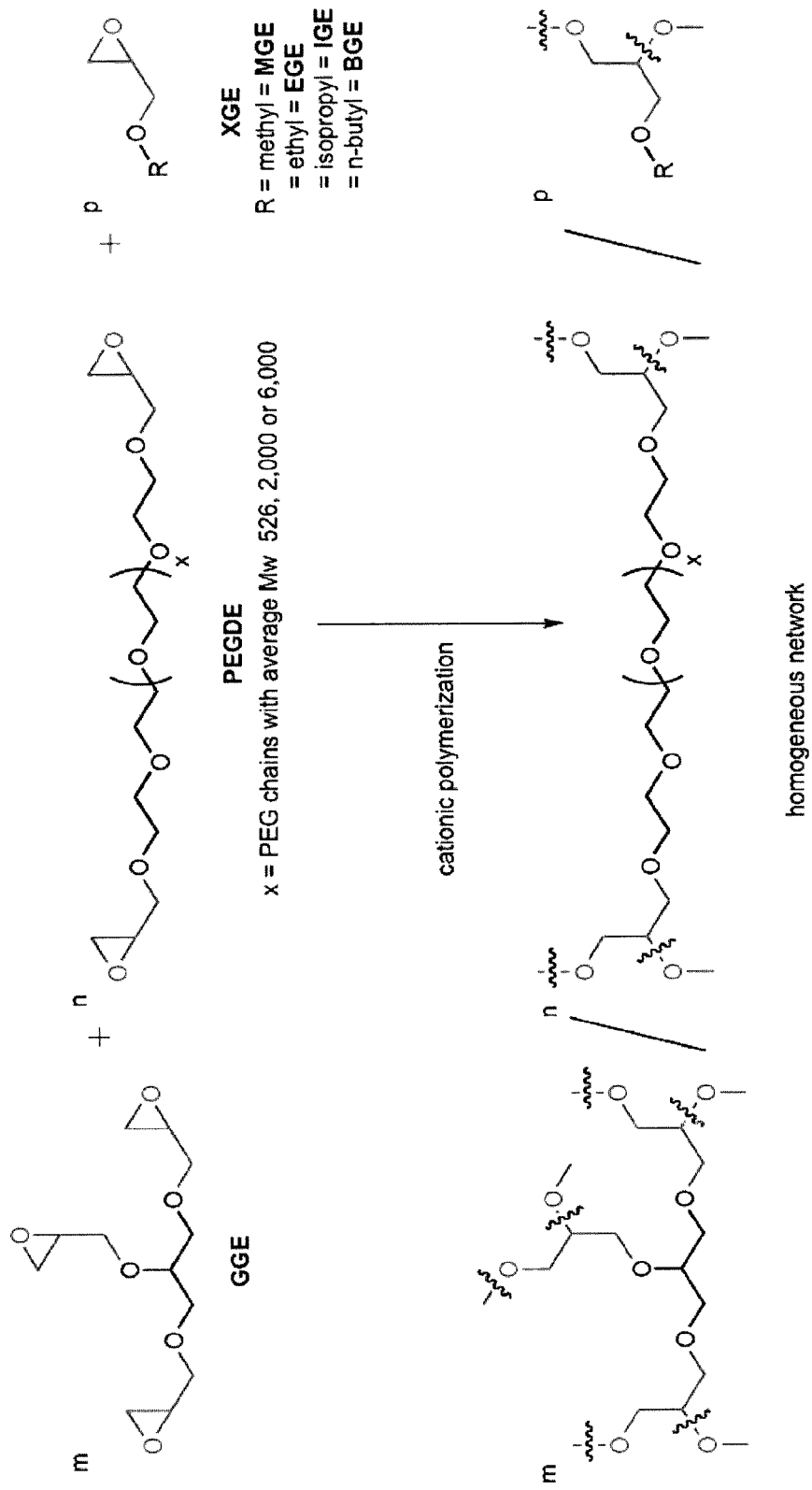

applicable to a wide range of glycidyl ether containing monomers. The method comprises the step of copolymerising (A) at least one multi-topic glycidyl ether comprising at least three glycidyl ether groups with (B) at least one glycidyl ether component comprising at least one glycidyl ether group by ring opening polymerisation, wherein the multi-topic glycidyl ether (A) is glycerol glycidyl ether (GGE) having the Formula (I) and the glycidyl ether component (B) is selected from monoglycidyl ethers comprising one glycidyl ether group and diglycidyl ethers comprising two glycidyl ether groups.

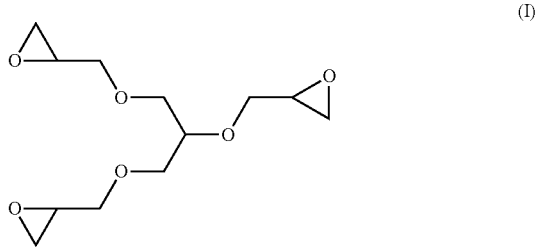

(I)

9 Claims, 12 Drawing Sheets

(51) Int. Cl.
C08G 59/38 (2006.01)
C08J 9/26 (2006.01)
C08L 63/00 (2006.01)

(52) U.S. Cl.
CPC ........... *C08L 63/00* (2013.01); *C08J 2207/10* (2013.01); *C08J 2371/00* (2013.01); *C08L 2203/02* (2013.01)

(58) Field of Classification Search
IPC ....................................................... G08G 59/36
See application file for complete search history.

(56) References Cited

U.S. PATENT DOCUMENTS

| | | | | |
|---|---|---|---|---|
| 5,162,174 | A * | 11/1992 | Andrei | G02F 1/1525 252/62.2 |
| 6,469,107 | B1 * | 10/2002 | Sato | C08G 65/22 429/309 |
| 6,677,084 | B1 * | 1/2004 | Matsui | C08G 65/22 429/305 |
| 2001/0035111 | A1 * | 11/2001 | Gienau | C04B 26/14 106/696 |
| 2006/0222596 | A1 * | 10/2006 | Askari | A61K 49/0457 424/9.41 |

OTHER PUBLICATIONS

Wang et al., "A study of the photoactivities and the thermomechanical properties of epoxy resins [cyclopentadien-Fe-arene]+ PF6-photoinitiators," Journal of Photochemistry and Photobiolgy A: Chemistry, vol. 163, pp. 77-86. (2004).*
STN Cas Registry, "Cas. Reg. No. 25038-04-4," copyright 2016.*
STN Cas Registry, "Cas. Reg. No. 31305-91-6," copyright 2016.*

* cited by examiner

A)

B)

POLYMER NETWORK MATERIAL COMPRISING A POLY(GLYCIDYL ETHER) STRUCTURE, METHOD OF ITS PRODUCTION AND USE

CROSS-REFERENCE TO RELATED APPLICATIONS

This application is a §371 national stage entry of International Application No. PCT/EP2013/067145, filed Aug. 16, 2013, which claims priority to European Application No. 12180812.5, filed Aug. 17, 2012 and European Application No. 12197494.3, filed Dec. 17, 2012, all of which are hereby incorporated herein by reference in their entireties.

The present invention is related to novel preparative methods to a novel class of polymer network materials with a highly branched poly(glycidyl ether) (PGE) structure. Said polymer networks are prepared by a simple procedure involving cationic ring-opening polymerisation and the method is applicable to a wide range of glycidyl ether containing monomers. Detailed structural analyses show that homo-, co-, and terpolymer networks can be produced with a highly homogeneous amorphous architecture, with composition variable in a modular fashion. This invention covers specifically monomers that lead to pure polyether network architectures based upon glycerol glycidyl ethers, poly(ethylene glycol) glycidyl ethers, and/or monoglycidyl ethers with various side chains. As such, these materials are anticipated to have applicability in multiple fields, similar to widely employed poly(ethylene glycol) (PEG) based materials.

There is a very large amount of precedence on the use of highly branched polyether based bulk materials in multiple applications: particularly in therapeutic areas due to the protein resistant nature of polyether motifs; and also in the fabrication of polymer based electrolytes for alkali metal ion batteries. In most cases these materials are produced from hyperbranched polyether macromonomers of intermediate molecular weight by covalent linkage. This necessitates an extended synthetic route and also varying crosslinking chemistries may be required, thus adding extra complexity to the final chemical structure.

PEG is an intensely utilised and studied polyether; relatively cheap, with FDA approval, and due to it's protein resistance (anti fouling), it has become the most widely used polymer in drug delivery applications (Angew. Chem. Int. Ed., 2010, 49, 6280-6308). In the field of polymer therapeutics, PEG chains conjugated to drugs or biomolecules confer 'stealth properties' that serve to prolong circulation times, increase hemocompatibility, and reduce immunogenicity (Nat. Rev. Drug Discov., 2003, 2, 347-360). In principle, polyether materials, including branched architectures such as hyperbranched polyglycerols, are considered to be highly biocompatible (Biomaterials, 2007, 28, 4581-4590).

In the field of regenerative therapy and controlled release, PEG based hydrogels are well established (Biomaterials, 2003, 24, 4337-4351). The neutral, hydrophilic, PEG chains can swell in water and are bioinert towards unwanted adhesion of external cells/biomolecules. There are multiple methods to control chemical composition of such PEG based hydrogels so as to mimic natural extracellular matrices (Angew. Chem. Int. Ed., 2011, 50, 7988-7997). Likewise, PEG based constructs make ideal platforms for the construction of synthetic stem cell niches in stem cell research and applications, in the form of hydrogels, 2-D films, or macroporous 3-D scaffolds (matrix Biol., 2005, 24, 208-218). In order to prepare such bulk materials additional chemistry is required. Higher molecular weight PEG chains tend to crystallize leading to lower control on material properties. It is therefore necessary to introduce branching to PEG based materials leading to physically or covalently crosslinked polymer networks or (semi) interpenetrating polymer networks (Macromolecules, 1996, 29, 3831-3838). There are various methods to prepare branched and star shaped PEG macromonomers (Prog. Polym. Sci., 2009, 34, 852-892); alternatively hyperbranched polyglycerol macromonomers have been covalently crosslinked to produce bulk hydrogels (Biomaterials, 2006, 27, 5471-5479). Crosslinking chemistry is often conducted by radical polymerisation of (meth) acrylate groups that have been attached as modifications to the base polyether (Macromolecules, 1998, 31, 8149-8156). Alternative methods can involve other high yielding reactions including Michael addition chemistry (Biomacromolecules, 2010, 11, 1348-1357), or 'click' cycloadditions (Chem. Commun., 2006, 26, 2774-2776). All of these modifications introduce non-ether moieties; for example, networks derived from PEG diacrylate can contain microphase separated regions due to the relatively hydrophobic polyacrylate backbones (J. Appl. Polym. Sci., 2011, 121, 531-540). Whilst the acrylate polymerisation route is by far the most employed method to produce PEG based materials, these constructs are not chemically homogeneous.

A further major application of polyether materials is in the fabrication of solid polymer electrolytes for battery applications for example with Li ion polymer batteries (Nature, 2001, 414, 359-367). Ethers help to solubilise mobile cations through non-covalent interaction, and the polymer itself serves as a mechanical load bearer for the battery device. In this case PEG based polymers are excellent candidates but again branching is required to minimise crystalline phase separation and increase ion conductivity. As an unwanted side effect, such branching lowers the load bearing strength of such materials. Another vital parameter is to have a low glass transition temperature, as ionic mobility is restricted if a polymer network is in the glass state (Eur. Polym. J., 2011, 47, 2372-2378). With these considerations, the search for optimal PEG based electrolytes is ongoing. Synthetic routes towards branched PEG network electrolytes are comparable to the branched macromonomer approach used to create PEG hydrogels (Solid State Ionics, 2002, 148, 399-404).

Additionally, due to the protein resistant properties of polyether materials, they are receiving much attention as biocompatible surface coatings (Chem. Asian J., 2010, 5, 1992-2000), or to provide marine antifouling (ACS Appl. Mater. Interfaces, 2010, 2, 903-912). Bulk, branched polyether materials have been identified as ideal for use in reverse-osmosis desalination applications where fouling in contact with sea water is a major issue (Science, 2011, 333, 712-717).

Despite large amounts of literature precedent on polyether materials, due in large part to the popularity of PEG materials, the approach to polyether network materials used in this invention is not well covered in the scientific literature. Poly(glycidyl ether) nanoparticles have been prepared by cationic polymerisation in miniemulsion (Soft Matter, 2010, 6, 4968-4975), but this does not extend to bulk materials. Cationic polymerisation of multitopic glycidyl ethers has been identified as an efficient route to poly(glycidyl ethers) by the Crivello group (J. Polym. Sci. Part A Polym. Chem., 2006, 44, 6435-6448), although this research was conducted on kinetics of the polymerisation and detailed structural analyses or the preparation of copolymers are not reported to our knowledge. Similar systems have been created by anionic polymerisation and the resultant polymers were applied as ion sequestrants (J. Appl. Polym. Sci., 2003, 87, 1445-1451). However, in this approach, no proof of bulk polymer network formation was reported and the products were obtained as powders. It is likely that anionic polymerisation is not suitable for poly(glycidyl ether) preparation as the highly branched polyether architecture binds cationic species thus inhibiting polymerisation.

BRIEF DESCRIPTION OF THE INVENTION

The present invention addresses the problem of establishing a facile method of preparing bulk branched polyether networks from abundant starting materials. The resulting PGE networks shall be chemically homogeneous and, ideally, contain only ether linkages. The method should further allow for tuning of bulk properties of the network materials in a consistent and rational manner.

These problems are at least partially solved by a method of preparing a polymer network material comprising a poly(glycidyl ether) structure, a highly branched polymer network materials and its use as defined in the claims and the present description.

The method of preparing a polymer network material comprising a poly(glycidyl ether) structure according to the present invention comprises the step of copolymerising (A) at least one multi-topic glycidyl ether comprising at least three glycidyl ether groups with (B) at least one glycidyl ether component comprising at least one glycidyl ether group by ring opening polymerisation, wherein the multi-topic glycidyl ether (A) is glycerol glycidyl ether (GGE) having the Formula I

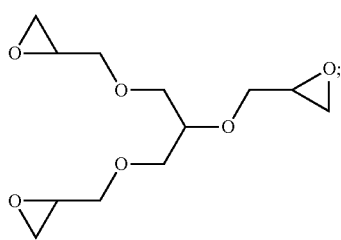

and the glycidyl ether component (B) is selected from monoglycidyl ethers comprising one glycidyl ether group and diglycidyl ethers comprising two glycidyl ether groups.

The glycidyl ether component (B) may selected from (low-molecular or small molecule) monomeric monogycidyl ethers or digycidyl ethers and (high-molecular) monogycidyl ether or digycidyl polyethers.

According to a preferred embodiment, the glycidyl polyether (B) has the structure according general Formula II

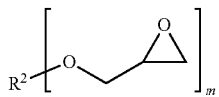

wherein $R^2$ is a branched or unbranched C1-C10 alkyl or alkylene, a branched or unbranched C2-C10 alkenyl or alkenylene, a branched or unbranched C2-C10 alkinyl or alkinylene, a C5-C30 aromatic or heteroaromatic a branched or unbranched C1-C10 alkyl ether or alkylene ether, a branched or unbranched C2-C10 alkenyl ether or alkenylene ether, a branched or unbranched C2-C10 alkinyl ether or alkinylene ether, or a C5-C30 aromatic ether or heteroaromatic ether, or $R^2$ is a polyether having the structure according general Formula III

wherein $R^3$ may be a branched or unbranched C1-C10 alkylene, a branched or unbranched C2-C10 alkenylene, a branched or unbranched C2-C10 alkinylene and x is an integer with $10 \leq x \leq 1,000$, and m is 1 or 2.

All of the aforementioned groups $R^2$ and $R^3$ in Formulas II and III, i.e. alkyl, alkylene, alkenyl, alkenylene, alkinyl, alkinylene, aromatic, heteroaromatic groups as well as the ethers of these may further be substituted with functional groups, particular with hydroxyl groups (—OH), sulfanyl groups (—SH), amido groups (—CONH), sulfate groups (—OSO$_3$H), sulfonate groups (—SO$_3$H), and/or phosphate groups (—OPO(OH)$_2$)

In case of the low-molecular comonomers, it is particularly preferred that $R^2$ in Formula II is a branched or unbranched C1-C6 alkyl or alkylene, a branched or unbranched C2-C6 alkenyl or alkenylene, a branched or unbranched C2-C6 alkinyl or alkinylene, a C5-C12 aromatic or heteroaromatic, a branched or unbranched C1-C6 alkyl ether or alkylene ether, a branched or unbranched C2-C6 alkenyl ether or alkenylene ether, a branched or unbranched C2-C6 alkinyl ether or alkinylene ether, or a C5-C12 aromatic ether or heteroaromatic ether.

According to particular preferred embodiments, the glycidyl ether component (B) is a monoglycidyl ether having the structure according general Formula IIa

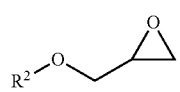

wherein $R^2$ is methyl, ethyl, ethene, n-propyl, isopropyl, propenyl (allyl), n-butyl, iso-butyl, tert-isobutyl, n-pentyl, iso-pentyl, or phenyl.

In case of polyethers, when $R^2$ has the structure according general Formula III, $R^3$ may be a branched or unbranched C1-C6 alkylene, a branched or unbranched C2-C6 alkenylene, a branched or unbranched C2-C6 alkinylene and x is an integer with 10 to 1,000.

According to particular preferred embodiments, the glycidyl ether component (B) is diglycidyl polyether having the structure according general Formula IIb

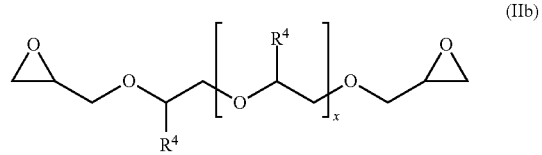

or a monoglycidyl polyether having the structure according general Formula IIc

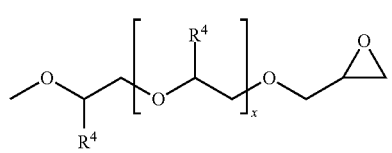

wherein $R^4$ is hydrogen (i.e. the polyether is poly(ethylene glycol) PEG) or methyl (i.e. the polyether is poly(propylene glycol) PPG).

The polyether group may have an average number molecular weight in the range of at 100 to 50,000 g/mol, in particular in the range of at 200 to 20,000 g/mol, preferably in the range of at 500 to 10,000 g/mol.

Preferably, the ring opening polymerisation is cationically initiated. Cationic ring opening may be achieved by different approaches, in particular by using a photoinitiator which, after irradiation with light of a suitable wavelength, dissociates to form a strong acid capable of protonating the glycidyl ether group. An example of such photoinitiator is diphenyl hexafluorphosphate. Alternatively, the reaction can be initiated by addition of a Lewis acid or a strong Bronsted acid to the reaction mixture. Examples of suitable protic Bronsted acids and Lewis acids comprise trifluoromethanesulfonic acid, trifluoroacetic acid, para-toluenesulfonic acid (at elevated temperatures greater than >80° C.), $TiCl_4$, $AlCl_3$, $SnCl_4$ and $BF_3.(OEt_2)_2$. Additionally, lithium salts with weakly associating counteranions such as $LiPF_6$ and $LiClO_4$ can promote polymerisation.

The polymerization is preferably conducted in the absence of a solvent. This means that typically no solvent is added to the mixture of reactants. If applicable, the reactant mixture might be slightly heated such as to melt the reactants in case solid or highly viscous reactants are applied.

The ring opening polymerisation of the initial reaction mixture leads to a transparent polymeric material having the shape of the reaction mould. For instance, when the reaction mixture is present between two plates the reaction will yield a transparent film.

The ring opening polymerisation reaction is preferably conducted in the absence of any solvent including water, as the educts are usually liquid. If one of the educts is not liquid, the reaction mixture may be heated above its melting point.

The polymerisation reaction is preferably conducted in one single step.

Preferably, the product of the ring opening polymerisation reaction is subjected to a postcuring step comprising storing the product for some time in the dark, optionally at elevated temperatures. For instance, the post curing step may comprise storing the product for at least 12 h, in particular for at least 24 h, preferably for at least 2 days.

In order to prepare porous polymer network materials, the ring opening polymerisation may be conducted in the presence of particles being essentially insoluble in the reaction mixture. The ring opening polymerisation in the presence of particles is then followed by a step (before or after postcuring) of extracting the particles by dissolving them with a solvent. The product will be a porous scaffold of the polymer network material having a pore size defined by the particle size. Suitable particles comprise inorganic salts, which may be dissolved and extracted in ethanol or water. This process is also referred to as "salt leaching". Pore sizes may be varied by the particle sizes and may be in the macoporous range, while porosity is determined by the salt content in the reaction mixture which may be varied in the range of 50 to 95 wt.-% with respect to the total mass of the mixture.

Furthermore, the ring opening polymerisation step may be followed by a step of functionalizing the polymer network material by covalently binding functional groups to the polymer network material. For this purpose, at least one of the glycidyl ether components (B) comprises a reactive group which can be functionalized in this way. Suitable groups comprise double bonds, particularly at a terminal position, for instance allyl or vinyl groups. Thus, suitable monomers comprise allyl glycidyl ether (AGE). Also, epibromohydrin may replace glycidyl ether components to incorporate bromide as a leaving group for nucleophilic substitution.

A further aspect of the invention relates to a polymer network material comprising a poly(glycidyl ether) structure obtainable by the method according to invention. The polymer is preferably a pure ether polymer, i.e. it does not contain any other linkages between the hydrocarbon moieties than ether linkages (—O—).

Still a further aspect of the present invention relates to a use of the polymer network material comprising a poly (glycidyl ether) structure for medical or biomedical articles or applications. In particular, the PGE materials described herein may be employed in the field of biomaterials. Possible applications of these materials include bioinert substrates for modification towards applications, particularly for specific cell adhesion, cell and tissue specific materials. Further applications include the use as antifouling coatings, as polymer electrolytes, or for reverse osmosis desalination/purification of water. References are given above under prior art.

The method according to the present invention offers a facile route to bulk branched polyether networks in a single step from abundant starting materials. The PGE networks according to the invention are chemically homogeneous containing only ether linkages. This allows for tuning of bulk properties of the network materials in a consistent and rational manner.

The access to branched polyether network bulk materials in a single step from cheap, commercially available, low or high molecular weight monomers is a very attractive synthetic methodology. The use of (photoinitiated) cationic polymerisation towards this end (from multitopic glycidyl ethers), has not previously been explored to any substantial degree. Previous approaches to polyether networks require additional synthetic steps and typically do not yield chemically homogenous structures comprised solely of polyether units. Varying monomer ratios to make homo-, co-, and terpolymer networks is a novel extension to any prior art. Detailed structural characterisations have shown that this approach is highly suited to the rational control of material properties by altering chemical composition. What this invention consists of is the establishment of PGEs as a versatile platform for the preparation of tailored polyether materials.

The invention allows for the preparation of branched polyethers as bulk materials by a facile, single step route, using cheap materials, and in the absence of solvent. The PGE polymer networks are chemically homogeneous and amorphous and are composed exclusively of ether units. There are no requirements for additional steps in the synthetic scheme. It is possible to vary composition to achieve a range of material properties in a highly rational manner. In principle, PGEs represent a class of branched polyethers that could be applied in any of the numerous fields where PEG based bulk materials are established.

This invention offers a unifying approach to polyether network bulk materials with a very wide range of controllable variables, such as degree of crosslinking, mesh size, glass transition temperature, Young's modulus, degree of swelling and other thermal and physical properties. Properties can be tuned by varying monomer composition in a predictable manner, and reaction conditions can be universally applied to a range of compositions with homogeneous and amorphous networks being produced. This method then is highly convenient; materials can be produced with very little time or resource investment, in a solvent free process. Due to the wide range of glycidyl ethers that can be incorporated as comonomers, heterobifunctional moieties can be incorporated within the network structure with homogeneous loading; this allows for further chemical functionalization of the materials. The chemical homogeneity of PGE networks, being purely based upon polyether units, offers distinct advantages over chemically crosslinked PEG based constructs. Dynamic thermal analyses indicate that polyglycidyl chains have relatively high conformational mobility and such materials have relatively low thermal glass transitions temperatures even at high crosslink density. Such materials can achieve high Young's modulus whilst retaining low glass temperature temperatures (consistently below body temperature at any composition). Microphase separation is not observed in these systems due to the composition being exclusively polyether based.

DETAILED DESCRIPTION OF THE INVENTION

The present invention will hereafter be described in more detail referring to the following figures:

FIG. 1: Multitopic glycidyl ethers which have been employed as comonomers testing the synthetic method to produce homogeneous homo-, co-, and terpolymer network materials.

Figure 2:
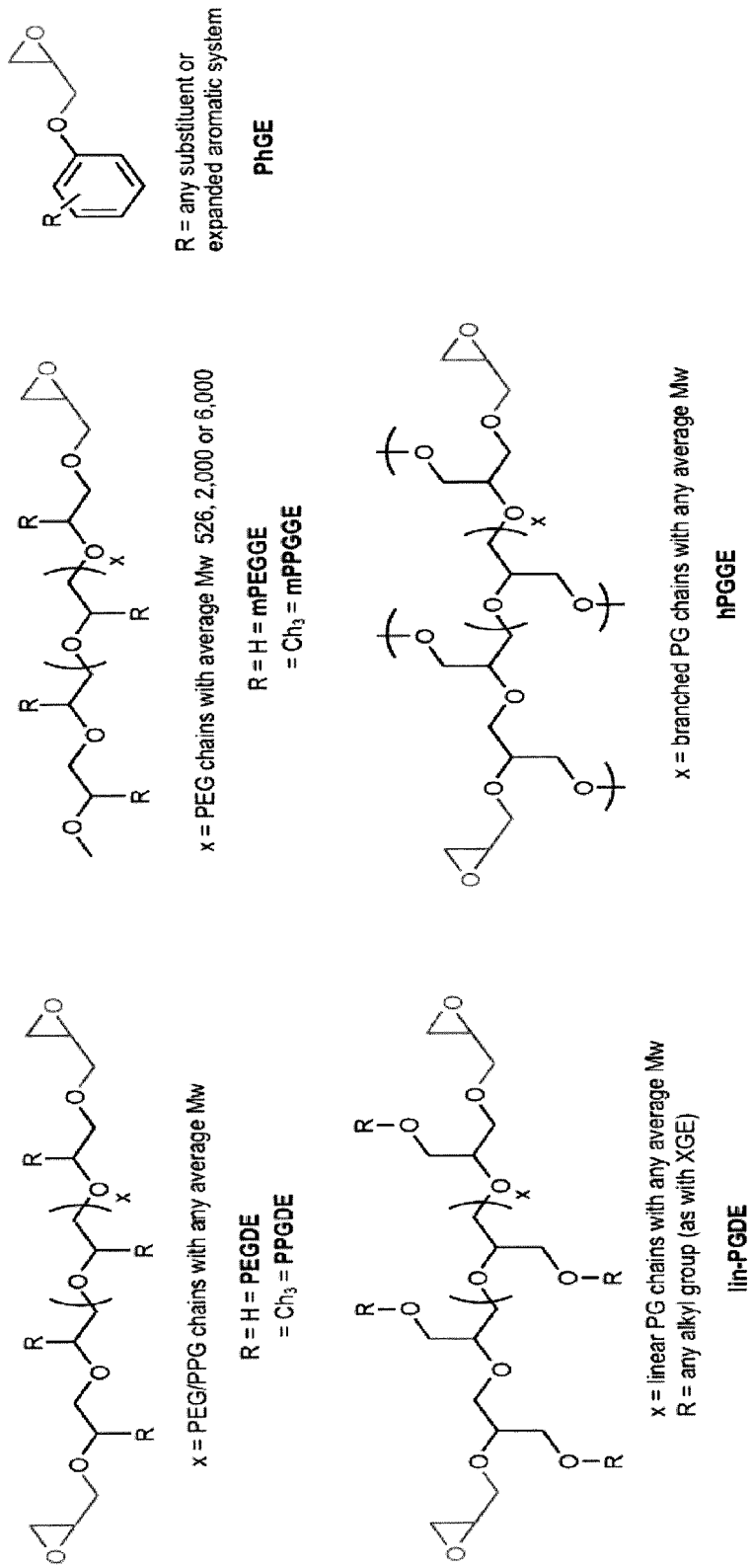

FIG. 2: Possible multitopic glycidyl ethers that could be incorporated by extending the preparative method described.

Figure 3:
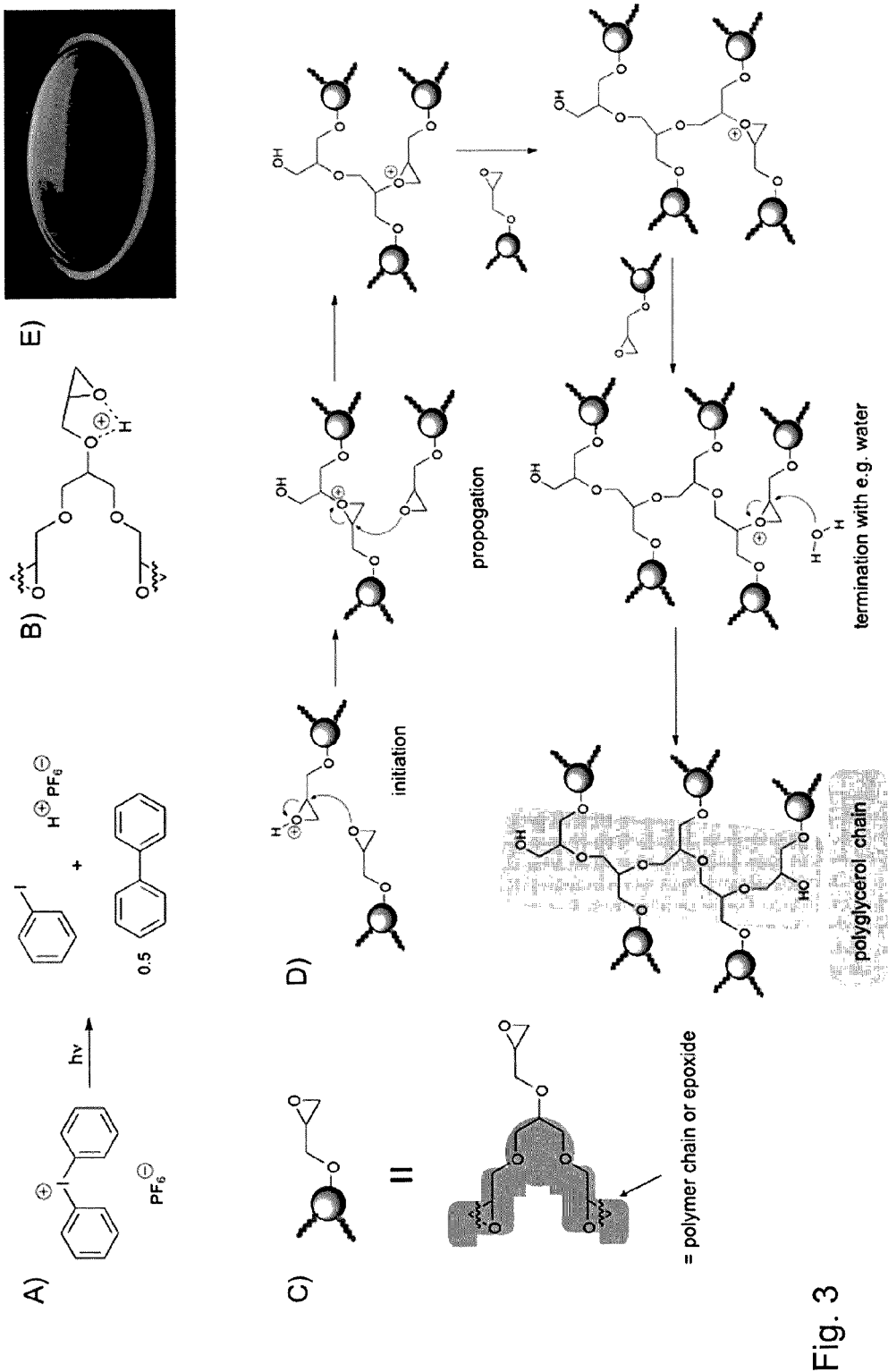

FIG. 3: Reaction scheme of the synthesis of UV-crosslinked PGEs: (A) Photolysis of the photoinitiator diphenyl hexafluorophosphate (B) Structure of the crosslinker GGE showing protonated mode (C, D) Exemplary reaction for PGE formation by the monomer GGE. (E) Transparent film product.

Figure 4:
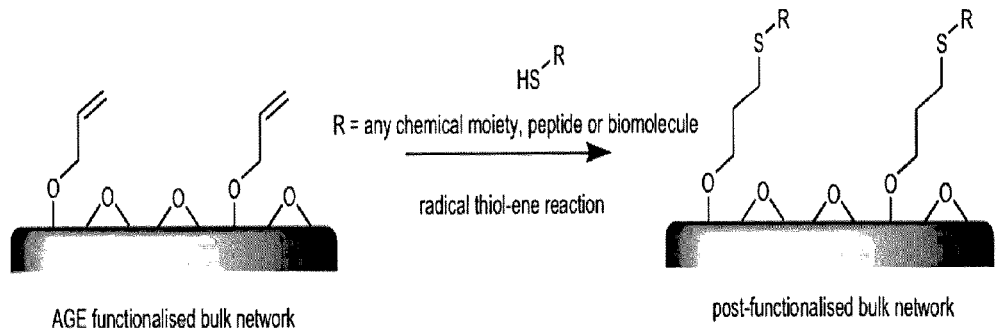

FIG. 4: General schematic overview on the process of attaching a range of synthetic functionalities to the polymer networks via use of AGE as a heterobifunctional linker.

Figure 5:
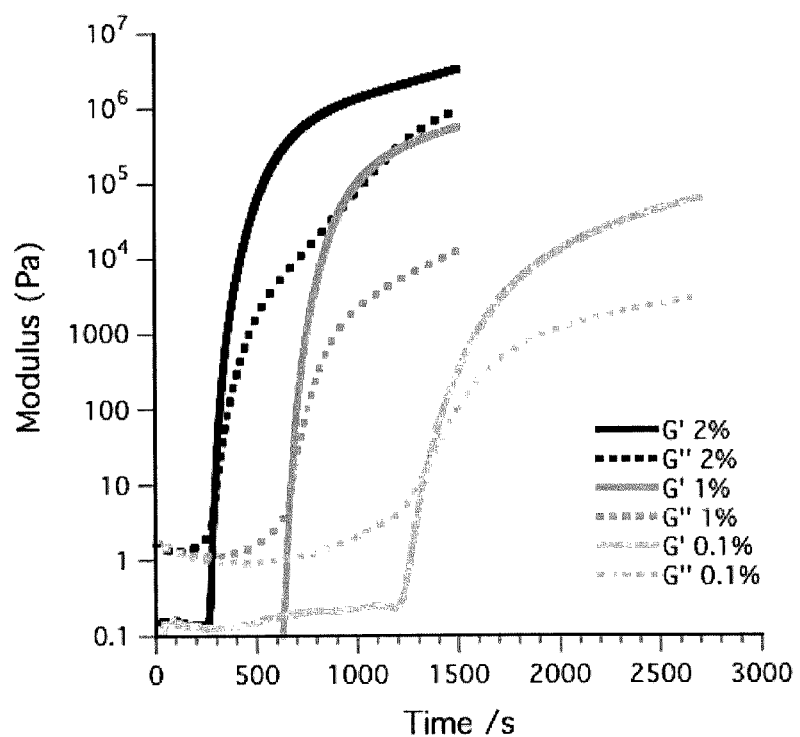

FIG. 5: Evolution of rheological storage and loss moduli (G' and G" respectively) during the polymerisation and hardening of GGE with varying initiator amount of 2.0, 1.0, and 0.1 wt. % under constant UV irradiation at 20° C.

Figure 6:
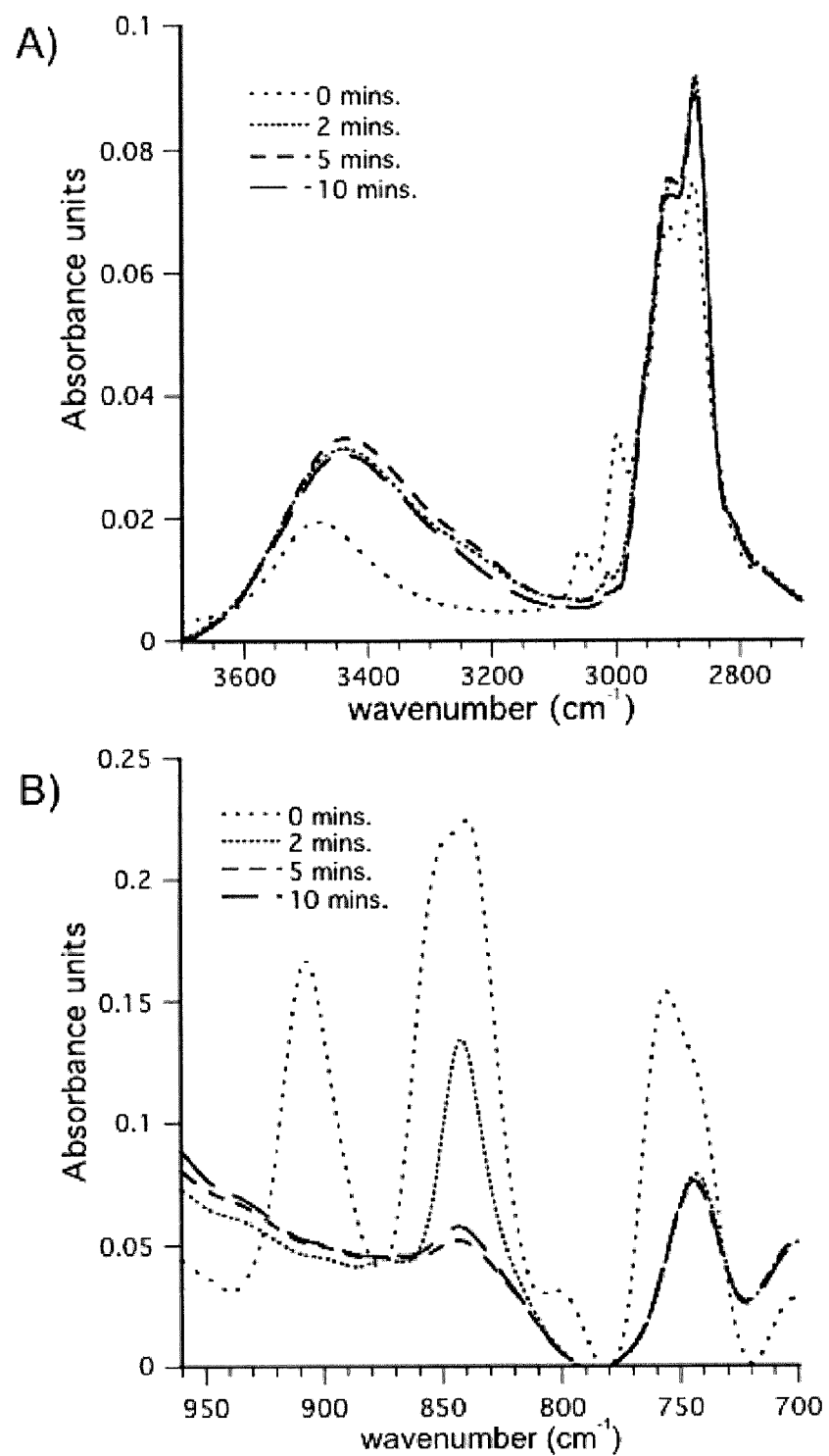

FIG. 6: Exemplary FT-IR spectra of a polyGGE network showing decrease of the epoxy ring absorption at 3056, 2998, 907, 839 and 756 cm$^{-1}$ depending on irradiation time intervals of 0, 2, 5 and 10 mins.

Figure 7:
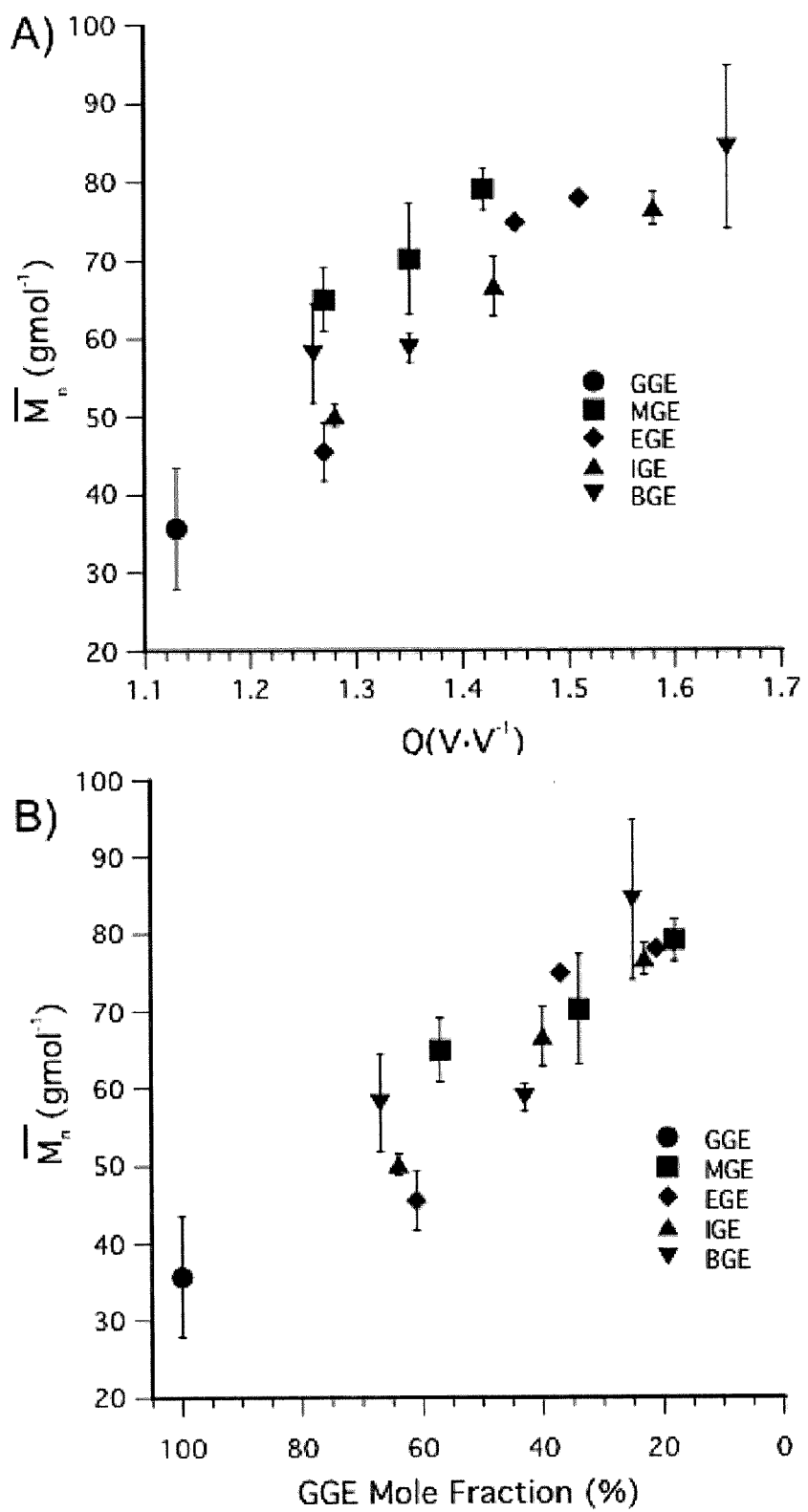

FIG. 7: Structure-property relationship between: A) degree of swelling (Q) and network chain segment length ($\overline{M}_n$); and B) mole fraction of crosslinker GGE and resultant $\overline{M}_n$ of GGE/XGE based copolymer networks.

Figure 8:
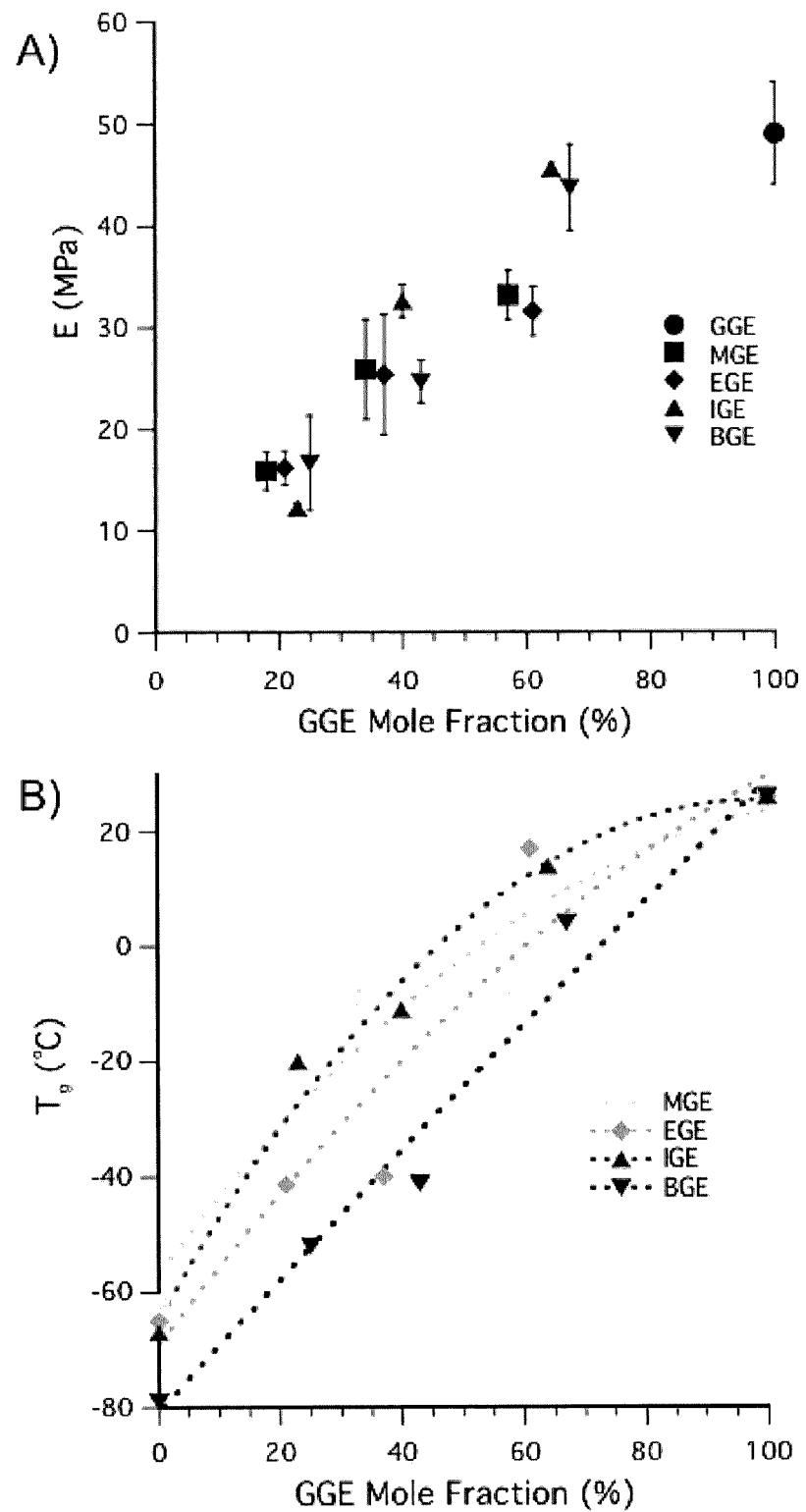

FIG. 8: Structure-property relationship between mole fraction of GGE crosslinker and A) elastic modulus (E); B) glass transition temperature ($T_g$), for GGE/XGE based copolymer networks.

Figure 9:
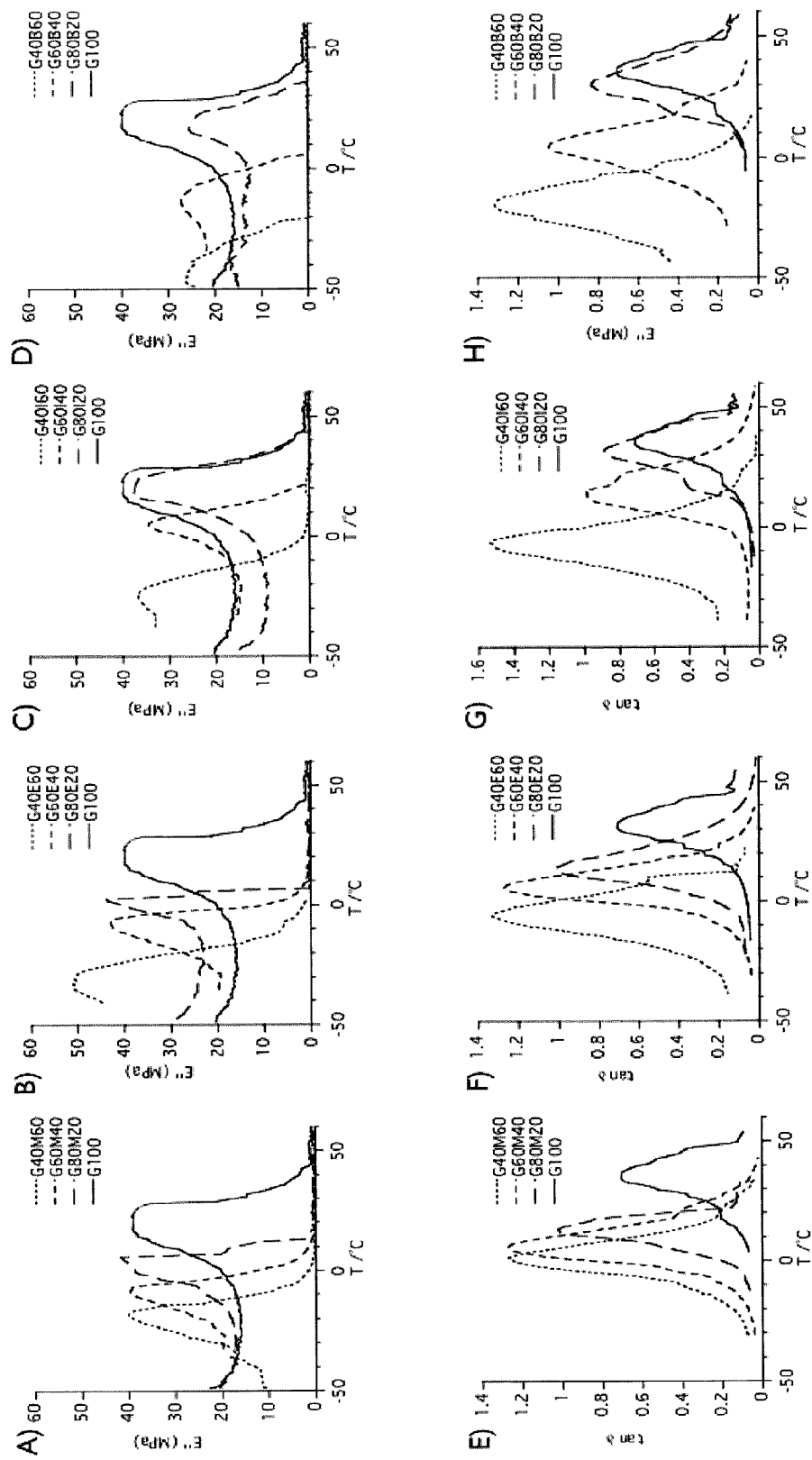

FIG. 9: Dynamic mechanical characterisation at varied temperature (DMTA) of GGE/XGE based copolymer networks: loss modulus E" (A),(B),(C),(D); tan δ (E),(F),(G),(H), for MGE, EGE, IGE and BGE incorporated networks respectively, with 0, 20, 40, 60 wt. % of alkyl glycidyl ether incorporated for each series (nomenclature corresponds to Table 1).

Figure 10:
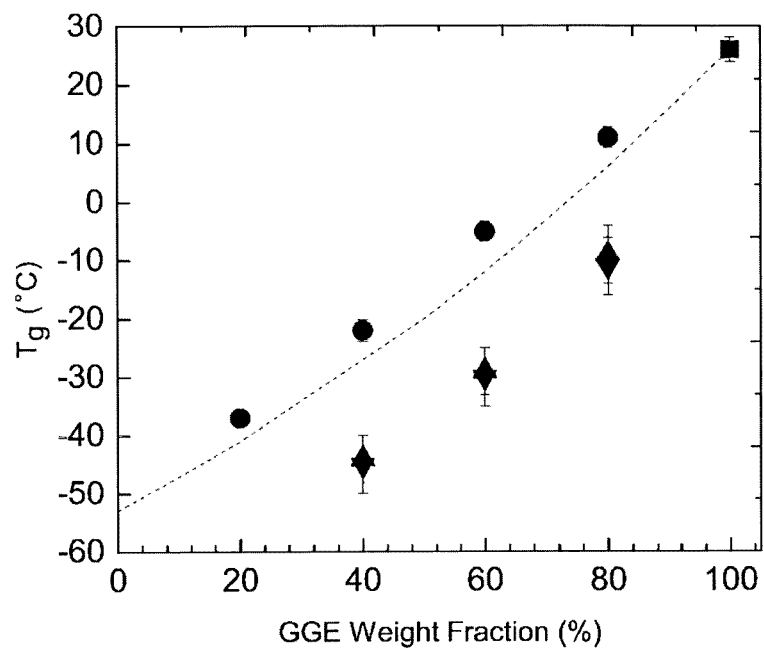

FIG. 10: Influence of the chemical composition on glass transition temperature, $T_g$, of the GGE/PEGDE copolyether networks. Polymer networks are the homopolymer GGE (■), or copolymers with: PEG$_{(525)}$DE (●), PEG$_{(2000)}$DE (▲), or PEG$_{(6000)}$DPE (▼). Dashed line in FIG. 1c indicates $T_g$ values predicted for PEG$_{(525)}$DE copolymer networks based on the Fox equation.

Figure 11:
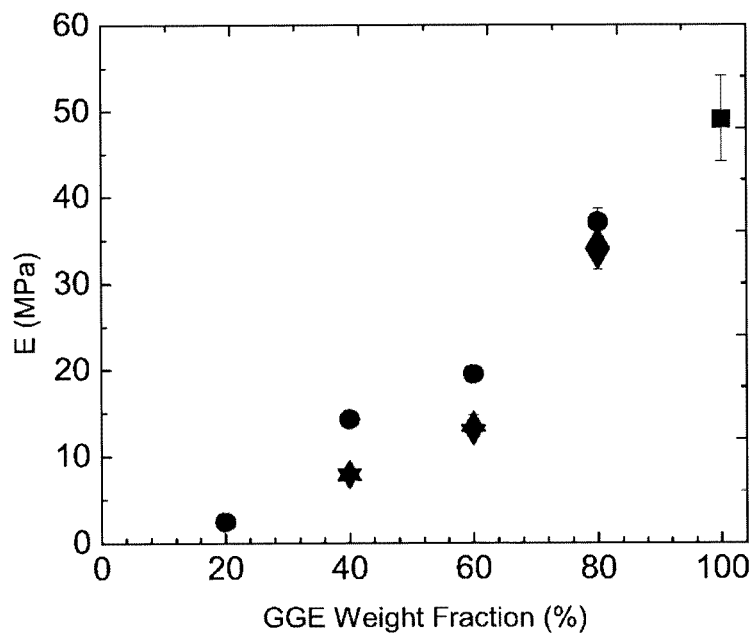

FIG. 11: Influence of GGE weight fraction in the comonomer feed on the Youngs elastic modulus of the GGE/PEGDE copolyether networks. Polymer networks are the homopolymer GGE (■), or copolymers with: PEG$_{(525)}$DE (●), PEG$_{(6000)}$DE (▲), or PEG$_{(6000)}$DE (▼).

Figure 12:
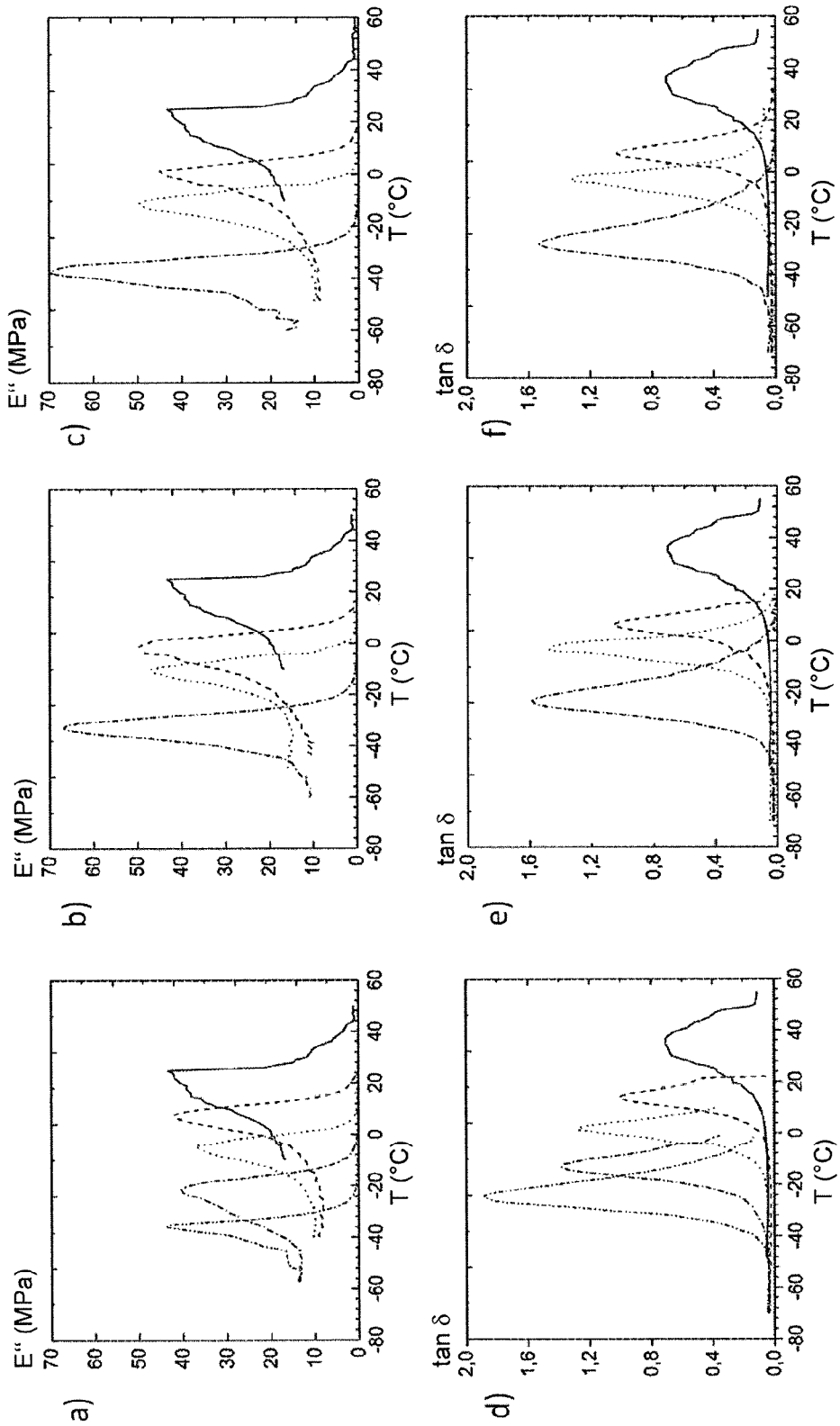

FIG. 12: Dynamic mechanical characterisation at varied temperature of copolyether networks of GGE/PEGDE: loss modulus E" (a-c); tan δ (d-f), for PEG$_{(525)}$DE, PEG$_{(2000)}$DE, and PEG$_{(6000)}$DE based networks respectively, at varied wt. % incorporation. Copolymer networks contain PEGDE by wt.: 0% (-), 20% (- - - -), 40% ( . . . . ) 60% (- . - . -), 80% (- . . - . . ).

Figure 13:
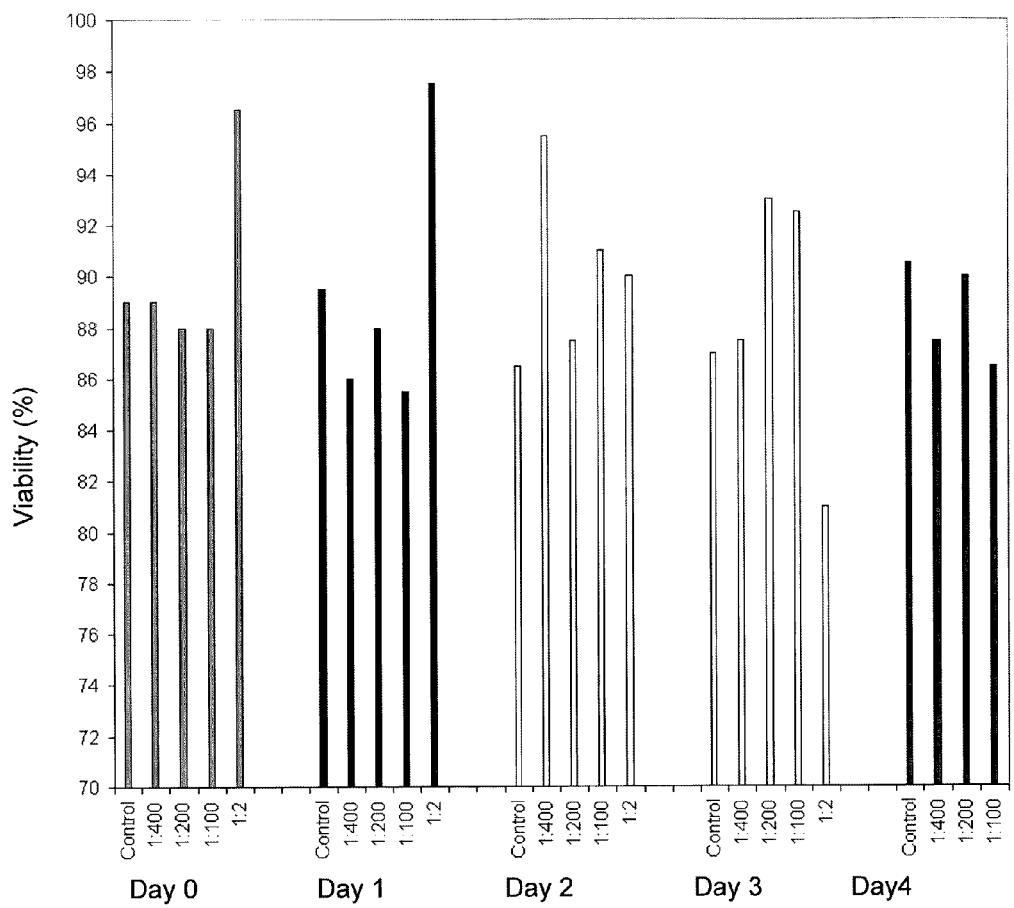

FIG. 13: Viability with rat Mesenchymal Stem Cells after exposure to extracts taken from films of a homopolymer of GGE at various concentrations and extraction times.

Figure 14:
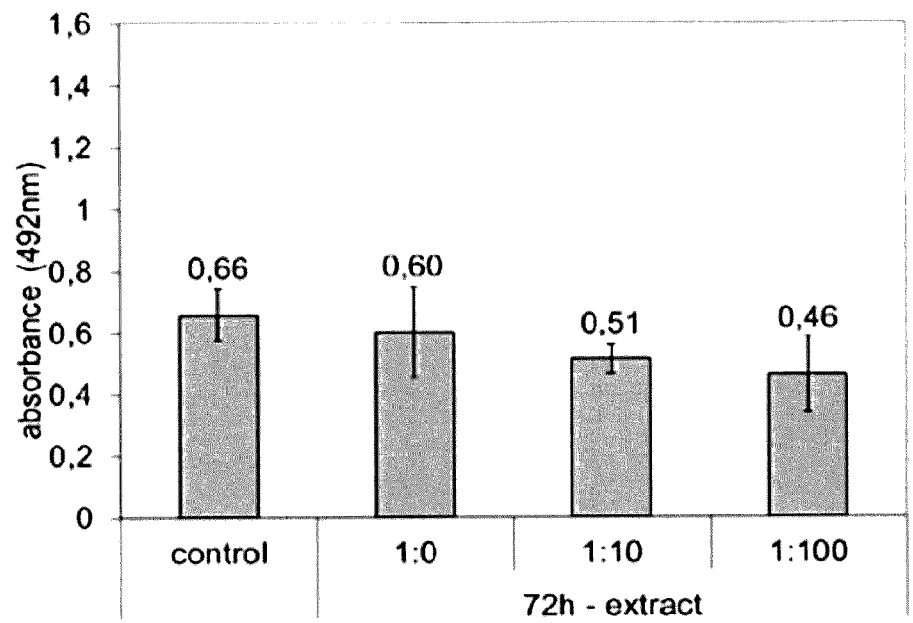
Figure 14:
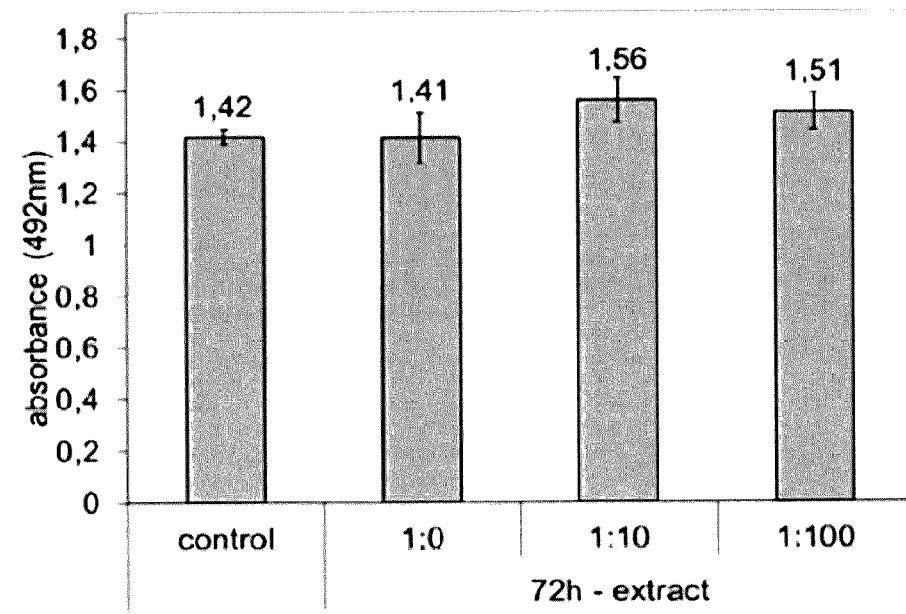

FIG. 14: LDH release in the extracellular fluid (A) and mitochondrial activity of the cells (B) after 48 h of culturing L929 Fibroblasts with pure cell culture medium (control) and with 72 h-extract of the sample; means±standard deviation, n=6 (LDH), n=8 (MTS).

The present invention relates to a method of preparing a polymer network material comprising a poly(glycidyl ether) structure and the PGEs obtainable by this method. The method comprises the step of copolymerising (A) at least one multi-topic glycidyl ether comprising at least three glycidyl ether groups with (B) at least one glycidyl ether component comprising at least one glycidyl ether group by ring opening polymerisation.

FIG. 1 shows certain examples of particular multi-topic glycidyl ethers (A) and glycidyl ether components (B) which have been tested (see Examples): glycerol triglycidyl ether GGE and other derivatives wherein glycdiyl ethers are replaced by an alcohol group, poly(ethylene glycol) diglycidyl ethers PEGDE with average molecular weights of 525, 2000, and 6000 respectively, alkyl monoglycidyl ethers XGE with varying side groups X; methyl glycidyl ether MGE, ethyl glycidyl ether EGE, isopropyl glycidyl ether IGE, n-butyl glycidyl ether BGE, and allyl glycidyl ether AGE.

However, the approach can be extended to any multitopic glycidyl ethers, for instance as shown in FIG. 2, particularly: monoglycidyl ethers with variable saturated and unsaturated alkyl side chains XGE, Phenyl glycidyl ether PhGE and other aryl (phenolic) glycidyl ethers, PEG digylcidyl ethers of any average molecular weight PEGDE, monomethyl PEG glycidyl ethers of any average molecular weight mPEGGE, poly(propylene glycol) diglycidyl ethers of any average molecular weight PPGDE and monomethyl poly(propylene glycol) glycidyl ethers of any average molecular weight mPPGGE, star shaped PEG constructs with multiply functionalised glycidyl ether end groups, linear polyglycerol diglycidyl ethers lin-PGDE with varying side chains and of any average molecular weight, hyperbranched polyglycerol glycidyl ethers hPGGE with hyperbranched core of any average molecular weight and with multiply functionalised gylcidyl ether end groups.

In the following typical procedures are described.

Polymerisation can be initiated by UV light irradiation by use of a photoinitiator (see Protocol a) below), or can be directly polymerised in bulk by addition of a suitable Lewis or strong Bronsted acid (Protocol b).

All educts are liquid and fully miscible, for higher Mw PEG units it may be necessary to melt them so reaction is performed above the respective melting temperature. Purification is conducted by soxhlet extraction with ethanol (or other polar solvents); gel contents are typically above 90%. Products are formed as colourless, transparent films of varying thermal and mechanical properties. All analyses indicate homogeneous polymer network formation.

Protocol a) Photoinitiated cationic ring opening polymerisation, typical procedure: Synthesis of the polymer networks is performed by a one-step procedure, which is based on photopolymerisation of the initial glycidyl ether monomer mixtures, in which the photoinitiator is dissolved. The initial mixture is poured into a mould and photopolymerisation is performed by irradiation of the mixture with a light source of a suitable wavelength. The reaction of this initial mixture, leads to a transparent film formation. The film products may then be left at dark for postcuring for several hours or days. The photocatalyst employed was diphenyliodonium hexafluorophosphate, although any derivative of such photocatalyst systems or thermolatent initiators could also be used in principle (Prog. Polym. Sci., 1998, 23, 1485-1538).

The reaction scheme of the photoinitiated cationic ring opening polymerisation is shown in FIG. 3. In this example, GGE as multi-topic glycidyl ether monomer was homopolymerized. The irradiation of the monomer-initiator mixture leads to photolysis of the photoinitiator forming the superacid $HPF_6$ (FIG. 3A). Polymerization occurs via the typical steps for cationic ring opening, however the kinetics of reaction are unusual and show strong tendencies towards frontal polymerization. During propagation, the acid-complexed, cationic epoxide intermediate is stabilised by the neighboring gylcidyl ether (FIG. 3B), which causes reactions to proceed sluggishly until exothermic reaction becomes autoaccelerated above a thermal threshold (FIGS. 3C,D). Theoretically the resulting carbocation can continue to propagate until all epoxide rings open, however steric and mobility restrictions makes this unlikely. A carbocation at any stage can be terminated by the presence of a nucleophilic impurity such as water. The resultant polymer is a densely crosslinked network structurally related to dendritic hPG polymers formed by related methods. The first step in the reaction involving the acid generation is the only step that is light-driven. The remaining steps are dark steps, which proceed under the driving force of the relief of epoxy ring strain. In such polymerizations, post curing is a crucial step, which means a long-lasting reaction after UV-irradiation, with propagation proceeding in the absence of further UV initiation. The product is transparent as shown in FIG. 3E.

Protocol b) With Lewis Acids/Bronsted Acids, Typical Procedure:

The cationic polymerisation can be initiated by addition of Lewis acids or strong Bronsted acids. To a prepared mixture of glycidyl ether containing monomers the Lewis or Bronsted acid is added. For instance, 1 wt. % of acid diluted in 1:1 weight ratio with diethyl ether may be added. Polymerisation occurs by vigorous reaction and the resultant films are left at room temperature, for example for 1 h. The film products are then left postcuring for several hours or days at elevated temperatures, for example for 4 days in an oven at 60° C. Preferably, $BF_3.O(Et)_2$ is employed as an example of a Lewis acid; trifluoromethanesulfonic is employed as an example of a protic Bronsted acid. However, any suitable acid catalyst can be employed with particular examples being trifluoroacetic acid, para-toluenesulfonic acid, $TiCl_4$, $AlCl_3$, $SnCl_4$, $LiPF_6$ and $LiClO_4$.

Protocol c) Production of Macroporous Scaffolds by Salt Leaching, Typical Procedure:

Particles of inorganic salts such as sodium chloride of predetermined size (prepared by controlled grinding and sieving) can be suspended in the viscous reaction medium using mechanical agitation with a vortex shaker. Salt content in the heterophase reaction medium can be varied in a wide range from 50 wt. % to 95 wt. %. Polymerisation following Protocol b with $BF_3O(Et)_2$ is then possible. Salt can be leached out by soxhlet extraction with water to give macroporous scaffolds with defined pore sizes.

Protocol d) Addition of Functional Groups by Incorporating Heterobifunctional Linkers, Typical Procedure.

Polymer networks were prepared with a comonomer ratio of GGE:PEG(526)DE:AGE 19:76:5 according to method described in Protocol a. To the prepared film in water (3 ml of water per 1 g of polymer network material) was added cysteamine hydrochloride (5 eq. per mole of AGE in comonomer feed) and ammonium persulfate (1 eq. per mole of AGE in comonomer feed) and the gently stirred medium was incubated at 60° C. for 3 h. The bulk film products were then purified by soxhlet extraction with ethanol. Presence of covalently bound amino groups can be determined by dye adsorption assays (with picric acid). FIG. 4 shows a generalised scheme of the thiol-ene chemical conjugation.

Reaction progress could be followed by rheological analysis to determine gelation point as shown in FIG. 5. Typically reactions proceed rapidly after an initial lag time as the exothermic reaction is autocatalytic. FTIR analysis indicates exhaustion of glycidyl ether groups in FIG. 6 Flory-Rehner theory was used to calculate crosslink density from degree of swelling in ethanol. Tensile tests were conducted to determine; Young's Modulus (E), tensile strength at yield point ($\sigma_y$), elongation at yield point ($\epsilon_y$), tensile strength at break ($\sigma_B$), and elongation at break ($\epsilon_B$). Dynamic mechanical thermal analyses were conducted to observe thermal transitions over a range of temperatures. These analyses indicate primarily sharp single peaks in the loss tangent (tan δ), relating to the molecular relaxations of polymer chains occurring during the glass transition. This is compelling evidence for homogeneous networks with a lack of heterophase separation. As the exception, in the case of IGE and BGE containing copolymer networks, secondary beta transitions were observed which are hypothesisesd to result from side chain (isopropyl and n-butyl) relaxations above critical temperatures. Dynamic scanning calorimetry was conducted to analyse thermal transitions, only a single transition was ever observed for any composition, that relating to the glass transition.

EXAMPLES

Materials

Glycerol glycidyl ether (GGE) was purchased from Raschig GmbH (Ludwigshafen, Germany) and distilled under reduced pressure prior to use. Methyl glycidyl ether (MGE), ethyl glycidyl ether (EGE), isopropyl glycidyl ether (IGE), n-butyl glycidyl ether (BGE) (ABCR, Karlsruhe, Germany). Poly(ethylene glycol) diglycidyl ethers (PEGDE) with number average molecular weights of 526, 2,000, 6,000 (PDI≤1.1 in all cases), and photoinitiator diphenyliodonium hexafluorophosphate were purchased from Sigma Aldrich (Hannover, Germany) and used without further purification. The photoinitiator diphenyliodonium hexafluorophosphate was also purchased from Sigma Aldrich and used without further purification.

Calculation of Network Properties

Gel content G and degree of swelling Q is calculated according to equations 1 and 2:

$$G = \frac{m_d}{m_{iso}} \times 100\% \quad (1)$$

$$Q = 1 + \rho_p \left[ \frac{m_s}{m_d \times \rho_s} - \frac{1}{\rho_s} \right] \quad (2)$$

where $m_{iso}$, $m_d$ and and $m_s$ are the weights of the crude, dry and swollen film, $\rho_p$ and $\rho_s$ are the densities of the polymer and the swelling agent respectively.

Crosslink density $\gamma$ and number average molecular weight $\overline{M}_n$ between crosslinks are calculated by using the modified Flory-Rehner equations 3 to 5 and equation 6, respectively:

$$\gamma = \frac{-[V_r + \chi V_r^2 + \ln(1 - V_r)]}{d_r V_0 \left( V_r^{1/3} - \frac{V_r}{2} \right)} \quad (3)$$

$$\theta = \frac{m_s - m_{iso}}{m_s} \times \frac{\rho_p}{\rho_s} \quad (4)$$

$$V_r = \left( \frac{1}{1+\theta} \right) \quad (5)$$

$$\overline{M_n} = \frac{1}{\gamma} \quad (6)$$

where, $\theta$ is the swelling coefficient, $V_r$ the volume fraction of the polymer, $d_r$ the density of polymer, $V_0$ molar volume of the swelling agent and $\chi$ polymer-solvent interaction parameter, also called Flory-Huggins interaction parameter.

The Flory-Huggins theory, modified by Blanks and Prausnitz (1964), allows establishing a relation between Flory-Huggins parameter and the solubility parameters of the polymer $\delta_p$ and solvents $\delta_s$ (eqn. 7):

$$\chi = \chi_s + \frac{V_1}{RT} (\delta_p - \delta_s)^2 \quad (7)$$

where $V_1$ is the molar volume of the solvent and $\chi_s$ the entropic contribution to $\chi$. The solubility parameter of a polymer $\delta_p$ is defined as a characteristic of a polymer used in predicting the solubility of that polymer in a given solvent. For polymers, it is usually taken to be the value of the solubility parameter of the solvent producing the solution with maximum swelling of a network of the polymer. Value of $\chi_s$ is typically kept constant and equal to 0.34. Therefore, polymer solvent interaction parameter takes the value of 0.34 for $\delta_p = \delta_s$ Rheology Analysis Rheological analysis of PGE films was performed on a Physica MCR 501 rheometer (Anton Paar GmbH) equipped with an external UV-light source (OmniCure UV LED spot curing system) having 365 nm UV LED head with 9,500 mW/cm² irradiance. Starting reaction mixtures were placed on the glass plate through which UV-light irradiation passes from the source below. The gap between the glass plate and the metal plate of the measuring system was set at a distance of 0.3 mm. Shear conditions were kept at constant values for all experiments (deformation $\gamma=0.5\%$ and radial frequency $\omega=10$ 1/s). In Example 1 (GGE/XGE copolymer network films), the measuring temperature was kept at constant values. In Example 2 (GGE/PEGDE copolymer network films), reaction temperature for the networks containing $PEG_{(526)}DE$, $PEG_{(2000)}DE$ and $PEG_{(6000)}DE$ was set to 50° C., 65° C. and 75° C. respectively.

FTIR Spectroscopic Analysis

FT-IR transmission spectra for PGE film samples are obtained using a Tensor 27 FT-IR Spectrometer (Bruker) with a standard DLaTGS-Detector.

Thermal Analysis

Thermal properties of the polymer networks were investigated by Thermal gravimetric analysis (TGA), Differential scanning calorimetry (DSC), and Dynamic mechanical analysis at varied temperature (DMTA).

TGA of the samples was performed on a TG 209 apparatus (Netzsch). The film samples were heated from 25 to 400° C. at a heating rate of 10 K·min$^{-1}$.

DSC was performed on a DSC 204 apparatus (Netzsch). The film samples were heated from 25 to 250° C. (GGE/XGE copolymer network films) or to 100° C. (GGE/PEGDE copolymer network films) at a heating rate of 10 K·min$^{-1}$, kept at this temperature for 2 minutes and cooled down to −100° C. (GGE/XGE) or to −50° C. (GGE/PEGDE) at 10 K·min$^{-1}$ with a nitrogen purge and kept for 2 minutes at that temperature. Thermal properties were determined from second heating run at 10 K·min$^{-1}$.

DMTA was performed on an EPLEXOR QC 25 (GABO QUALIMETER Testanlagen GmbH) equipped with a 25 N load cell, at a frequency of 10 Hz and a heating rate of 2 K·min$^{-1}$ in a temperature range between −50° C. and +100° C. (GGE/XGE) or between −30° C. to +70° C. (GGE/PEGDE).

Mechanical Analysis

Tensile properties of the polyether network films were determined on a Zwick tensile tester (2.5N1S, Zwick GmbH & Co, Ulm, Germany) equipped with a 50 N load cell at an elongation rate of 2 mm·min$^{-1}$. Sample dimensions were 3 mm×10 mm with a thickness of about 0.3 mm.

1. Glycerol Glycidyl Ether/Monoglycidyl Ether (GGE/XGE) Copolymer Networks 1.1. Synthesis and Network Formation GGE/XGE copolymer network films were synthesized in a one-step procedure, based on photo-polymerization of the initial glycidyl ether monomer mixture, in which the photoinitiator was dissolved. The initial monomer mixture was composed of either the GGE crosslinker itself or of a mixture comprising the GGE crosslinker and an alkyl glycidyl ether XGE, selected from methyl glycidyl ether MGE, ethyl glycidyl ether EGE, isopropyl glycidyl ether IGE, and n-butyl glycidyl ether BGE, where the alkyl glycidyl ethers XGE acted as the chain extension segments. For each mixture a weight ratio of the crosslinker to alkyl glycidyl ether GGE:XGE of 80:20, 60:40 and 40:60 was established. The photoinitiator concentration was kept at 2.0 wt-% with respect to the initial mixture amount. The unreacted mixture was poured into a mould formed by two silanized glass slides (25 mm×75 mm), where a Teflon frame of 0.5 mm thickness was placed in between as the spacer to determine the thickness of the final product. Photopolymerization was performed with UVEX model SCU-110 mercury lamp, which was placed at a distance of 5 cm from glass slides. The reaction of this initial mixture, lead to a transparent film formation; the film products were left at dark for postcuring for 4 days.

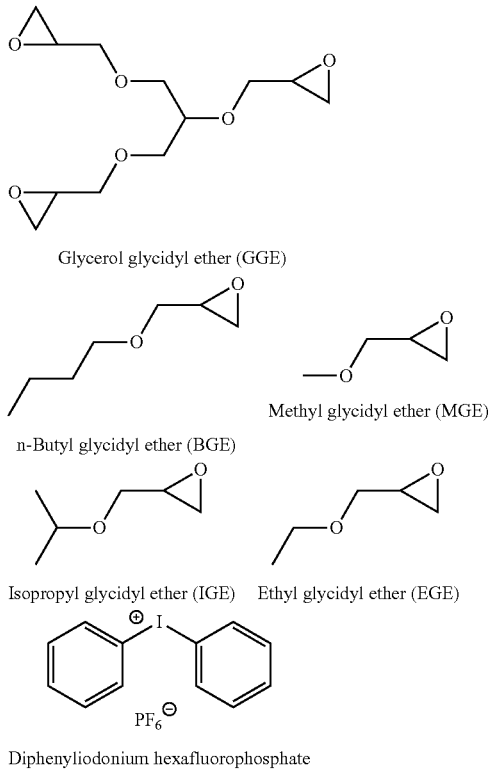

Glycerol glycidyl ether (GGE)

Methyl glycidyl ether (MGE)

n-Butyl glycidyl ether (BGE)

Isopropyl glycidyl ether (IGE)   Ethyl glycidyl ether (EGE)

Diphenyliodonium hexafluorophosphate

Cross sections (10 mm×20 mm) were taken from the cured transparent film samples and immersed in ethanol overnight for swelling and removal of unreacted components. The swollen films were then weighed and dried at 50° C. in high vacuum for one week until the weight reaches a constant value.

1.2 Reaction Kinetics

Reaction kinetics during crosslinking were investigated by rheological analysis. Each sample was irradiated by UV until the ignition period was complete and network formation observed. Oscillatory tests were conducted to allow carrying out the measurement without any internal destruction to the sample during the curing process. Thus it was possible to examine time dependent formation of a chemical network during the measurement. Initially, G" (loss modulus) >G' (storage modulus), characteristic of the viscous fluid reactants. Upon irradiation a delay period is observed, followed by rapid increase in both moduli and an eventual inversion to show characteristics of a solid material where G'>G". The gel time ($t_{GT}$) is measured at the intersection where G'=G" or alternatively cited as tan δ=G"/ G'=1, and signifies the onset of the hardening process in cured thermoset networks. FIG. 5 shows typical changes in rheological parameters during the polymerization process, and is indicative of an autocatalytic process where rapid onset of gelation is observed after a delay period.

The ring opening reaction could be monitored by FTIR spectroscopy. FIG. 6 shows the changes in the absorbance spectra of a reaction mixture only containing GGE after different irradiation times. The reduction of the peaks at 3056, 2998 and 907, 839 and 756 wavenumbers, which are attributed to epoxy vibrational frequencies, is indicative of the ongoing ring opening reaction. Literature states that peaks at 3056 and 2998 are particularly characteristic of oxirane compared to acyclic ethers. The broad absorbance from 3600 to 3300 cm$^{-1}$ is related to the hydrogen-bonded OH groups. At 3432 cm$^{-1}$ hydroxyl groups are formed by the acid-catalyzed epoxy ring opening reaction. High conversions are observed with no significant oxirane peaks remaining in the prepared films.

1.3. Characterisation of the Networks

For each crosslinked polymer network, gel content (G), degree of swelling (Q), crosslink density (γ), and number average molecular weight between the crosslinks (i.e. network chain segment $\overline{M}_n$) were calculated from swelling data according to the Flory-Rehner equations as set forth above. The compositions of copolymers employed had significant influence on these parameters as shown in Table 1.

TABLE 1

Chemical composition, degree of swelling (Q), gel content (G), density (ρ), crosslink density (γ), and network chain segment length ($\overline{M}_n$) of the PGBNs studied.

| Series$^a$ | Q [V·V$^{-1}$] | G [%] | ρ [g·cm$^{-3}$] | γ [mol·cm$^{-3}$]·10$^3$ | $\overline{M}_n$ [g/mol] |
|---|---|---|---|---|---|
| G$_{100}$ | 1.13 | 99 | 1.43 | 28.2 ± 1 | 35.7 ± 7.8 |
| G$_{80}$M$_{20}$ | 1.27 | 98 | 1.39 | 15.3 ± 1 | 65.0 ± 4.1 |
| G$_{60}$M$_{40}$ | 1.35 | 98 | 1.22 | 14.2 ± 1 | 70.2 ± 7.1 |
| G$_{40}$M$_{60}$ | 1.42 | 97 | 1.17 | 11.3 ± 0.1 | 79.1 ± 2.7 |
| G$_{80}$E$_{20}$ | 1.27 | 96 | 1.12 | 21.9 ± 1 | 45.5 ± 3.8 |
| G$_{60}$E$_{40}$ | 1.45 | 95 | 1.07 | 13.3 ± 0.1 | 74.9 ± 0.4 |
| G$_{40}$E$_{60}$ | 1.51 | 97 | 1.01 | 12.9 ± 0.1 | 78.0 ± 0.1 |
| G$_{80}$I$_{20}$ | 1.28 | 95 | 1.20 | 19.9 ± 5.3 | 50.2 ± 1.4 |
| G$_{60}$I$_{40}$ | 1.43 | 90 | 1.17 | 14.9 ± 0.1 | 66.7 ± 3.8 |
| G$_{40}$I$_{60}$ | 1.58 | 94 | 1.03 | 13.0 ± 0.4 | 76.7 ± 2.1 |
| G$_{80}$B$_{20}$ | 1.26 | 97 | 1.30 | 17.2 ± 0.1 | 58.1 ± 6.3 |
| G$_{60}$B$_{40}$ | 1.35 | 97 | 1.09 | 16.9 ± 0.5 | 58.8 ± 1.8 |
| G$_{40}$B$_{60}$ | 1.65 | 92 | 1.08 | 11.8 ± 1.3 | 84.4 ± 10 |

$^a$G = GGE, M = MGE, E = EGE, I = IGE, B = BGE; numerical values indicate the weight fraction in %

For each polymer network, gel content is high (≥92%) indicating high conversion.

It can be seen in FIG. 7A that the degree of swelling (Q) correlates to the calculated chain segment length ($\overline{M}_n$, number average molecular weight of polymer chains between crosslink points). Likewise, $\overline{M}_n$ inversely correlates to the amount of crosslinking GGE employed in the comonomer feed as shown in FIG. 7B. Clearly in this system crosslink density can be controlled by composition as the monoglycidyl ethers produce linear units upon polymerisation.

1.4. Thermal and Mechanical Properties

Various thermal and mechanical properties of homo- and copolymer networks with varying comonomer ratios as determined by TGA, DSC and DMTA are shown in Table 2.

TABLE 2

Mechanical properties of polyglycerol networks determined by tensile tests at room temperature; glass transition temperature ($T_g$), Young's Modulus (E), tensile strength at yield point ($\sigma_y$), elongation at yield point ($\epsilon_y$), tensile strength at break ($\sigma_B$), elongation at break ($\epsilon_B$).

| Series[a] | $T_g$, DSC [° C.] | E [MPa] | $\sigma_y$ [MPa] | $\epsilon_y$ [%] | $\sigma_B$ [MPa] | $\epsilon_B$ [%] |
|---|---|---|---|---|---|---|
| $G_{100}$ | 26 | 49.1 ± 5 | 2.2 ± 0.5 | 4.7 ± 1.4 | 2.2 ± 0.5 | 4.7 ± 1.4 |
| $G_{80}M_{20}$ | −7 | 33.2 ± 2.4 | 4.2 ± 0.4 | 13 ± 0.7 | 4.0 ± 0.5 | 13 ± 0.7 |
| $G_{60}M_{40}$ | −9 | 25.9 ± 4.9 | 1.4 ± 0.6 | 6.2 ± 2.3 | 1.4 ± 0.6 | 6.2 ± 3.0 |
| $G_{40}M_{60}$ | −28 | 15.9 ± 1.9 | 1.3 ± 0.2 | 10 ± 1.6 | 1.3 ± 0.2 | 10 ± 1.7 |
| $M_{100}$ | −62 | | | | | |
| $G_{80}E_{20}$ | 17 | 31.6 ± 2.4 | 3.5 ± 1.0 | 12 ± 3.1 | 3.3 ± 1.1 | 12 ± 3.1 |
| $G_{60}E_{40}$ | −40 | 25.4 ± 5.9 | 2.6 ± 0.3 | 4.5 ± 0.3 | 2.2 ± 0.2 | 4.6 ± 0.3 |
| $G_{40}E_{60}$ | −41 | 16.2 ± 1.7 | 0.6 ± 0.5 | 3.7 ± 0.5 | 0.6 ± 0.6 | 3.7 ± 0.5 |
| $E_{100}$ | −65 | | | | | |
| $G_{80}I_{20}$ | 14 | 45.6 ± 0.6 | 3.1 ± 0.3 | 7.4 ± 0.7 | 2.7 ± 0.4 | 7.5 ± 0.7 |
| $G_{60}I_{40}$ | −11 | 32.6 ± 1.6 | 1.4 ± 0.4 | 4.6 ± 1.4 | 1.2 ± 0.4 | 4.6 ± 1.3 |
| $G_{40}I_{60}$ | −20 | 12.2 ± 0.5 | 0.5 ± 0.1 | 4.9 ± 0.5 | 0.4 ± 0.1 | 5.0 ± 0.5 |
| $I_{100}$ | −67 | | | | | |
| $G_{80}B_{20}$ | 4 | 43.8 ± 4.2 | 2.4 ± 0.5 | 6.0 ± 1.3 | 2.2 ± 0.6 | 6.1 ± 1.2 |
| $G_{60}B_{40}$ | −41 | 24.7 ± 2.1 | 0.8 ± 0.1 | 3.6 ± 0.6 | 0.8 ± 0.1 | 3.7 ± 0.6 |
| $G_{40}B_{60}$ | −52 | 16.7 ± 4.7 | 0.3 ± 0.3 | 2.2 ± 1.7 | 0.3 ± 0.3 | 2.2 ± 1.7 |
| $B_{100}$ | −79 | | | | | |

[a]G = GGE, M = MGE, E = EGE, I = IGE, B = BGE, numerical values indicate the weight fraction in %.

Young's moduli E, determined by tensile testing, are variable in the range of 50-10 MPa and are highly tunable in a rational manner. As seen in FIG. 8A, an almost linear dependence can be drawn between the mole fraction of GGE crosslinker and the modulus value. Young's moduli were found to be highly dependent on crosslink density controlled by comonomer ratio, and less sensitive to the actual nature of the glycidyl ether side chains incorporated.

As determined by DSC, glass transition temperatures $T_g$ are also proportional to crosslink density of the networks as shown in FIG. 8B. Transition temperatures $T_g$ are all below body temperature and are variable between 26 and −80° C. This variance in $T_g$ correlates to the ratio of monoglycidyl ether to crosslinker GGE and is also specific to the nature of the monoglycidyl ether sidechain. This phenomenon can be attributed to the increased mobility of longer alkyl side chains. Glass transition temperatures for copolymer networks at all ratios show a good fit to estimates derived from the Fox equation.

The general trend of weight loss as analyzed by TGA is around 1 wt.-% up to 100° C., which is possibly due to loss of water.

In order to gain more detailed information on the scale of molecular processes occurring during thermal transition, DMTA measurements were conducted, measuring storage and loss moduli over a temperature range. The results of DMTA measurements are shown in FIG. 9 with single peaks in loss tangent relating to glass transition (see general remarks). As the glass transition is approached loss modulus E" rises to a maximum consistent with increased mobility of the polymer chains in the network. For the studied polymer networks the temperature values at the maximum of loss modulus are consistent with the glass transition temperature values obtained from DSC. As the material becomes deformable with increasing temperature, storage modulus E' decreases. The rise in E" concomitant with lowering of storage modulus E', leads to an increase in E"/E', which value is known as the loss factor, or tan δ. The height and shape of tan δ gives information on the molecular processes occurring during the thermal transition, and the position of the highest point relates to glass transition temperature. For the studied networks, tan δ is generally observed as a single relatively narrow peak indicating that molecular relaxations occur in a narrow range of temperatures and a single transition occurs. This is strong support for a highly homogeneous network.

Summarizing, the films prepared by bulk, highly branched GGE/XGE copolymer networks are transparent and have single thermal glass transitions below room temperature. Mechanical properties can be tuned by varying the crosslink density through incorporation of monoglycidyl ethers. Evidence points towards glycidyl ether side chains having significant influences on thermal transitions within the network. By varying comonomer ratio it is possible to control the network chain segment length which has a very clear influence on network behavior such as swelling, and on the mechanical properties. These findings are all characteristic of a homogeneous network structure.

2. Glycerol Glycidyl Ether/PEG Diglycidyl Ether (GGE/PEGDE) Copolymer Networks 2.1. Synthesis and Network Formation PEG-based polyether networks were synthesized by photopolymerization of an initial mixture of PEGDE of different molecular weight ($M_n$=526, 2000 and 6000 g/mol) and GGE in different weight ratios, and diphenyl iodonium hexafluorophosphate as photoinitiator. The content of the photoinitiator diphenyl iodonium hexafluorophosphate was kept at 2 wt.-% with respect to the initial mixture amount. In the cases of $PEG_{(2000)}DE$ and $PEG_{(6000)}DE$, the initial monomer mixtures were heated above the melting point of the corresponding PEGDE ($T_m$=54° C. and 62° C., for $PEG_{(2000)}DE$ and $PEG_{(6000)}DE$ respectively). The reaction was performed using Physica MCR 501 rheometer (Anton Paar GmbH) equipped with an external UV-light source. The initial liquid mixture was placed between the glass and metal plates, which were preheated to the reaction temperature. The distance between glass and metal plates was set to 0.3 mm which resulted in a corresponding thickness of the final film product.

Subsequent to the reaction of the initial mixture and network formation, the transparent film products were left in darkness for postcuring for 4 days. Cross sections (10 mm×20 mm) were taken from the cured film samples and immersed in ethanol overnight for removal of unreacted components. The swollen films were then weighed and dried at 50° C. in high vacuum until the weight reached a constant value. A reswelling procedure was then performed in the same manner.

2.2. Reaction Kinetics

Rheology analysis reveals the reaction kinetics and the progress of the crosslinking reaction. For thermosetting polymers rheological data is used mostly to identify gel points. Upon intense irradiation of the initial reaction mixture, the viscosity increase takes place due to gelation. Viscosity approaches infinity at the gel point, the characteristic value that indicates an infinite network. Gel time analysis of the polyether networks reveals the trend for the time of the network formation for each series composed of PEGDE with different molecular weights and in their different weight ratios. When each PEGDE series with different molecular weights is examined on their own, the increasing trend in gel time with decreasing GGE amount can be clearly distinguished (data not shown). Reaction compositions having relatively more GGE content were faster in gelation, thus in network formation. It is important to note that due to reactions requiring different temperatures in order to maintain PEGDE in the molten state, it is not possible to compare reaction kinetics between the different series.

2.3. Characterisation of the Networks and Thermal and Mechanical Properties

Various network properties and thermal and mechanical properties of homo- and copolymer networks with varying comonomer ratios are shown in Table 3.

works are dependent on the GGE amount in the networks, i.e. crosslink density. $T_g$ decreases as the ratio of tritopic GGE to ditopic PEGDE is reduced due to more restricted movement of the molecular chains in the structure. The $T_g$ values observed for the $PEG_{(526)}DE$ networks are in close agreement with those predicted by the Fox Equation across the range of comonomer ratios employed (shown as dashed line in FIG. 10).

As shown in FIG. 11 Young's modulus E is variable in the range of 2 to 50 MPa suitable for biomaterial and other applications and largely correlates with the ratio of tritopic GGE to ditopic PEGDE comonomers employed, with the mechanical properties being reliant on crosslink density. Likewise elongation at break $\epsilon_B$ increased in a rational fashion from the lowest value (ca. 5%) for GGE homopolymer to the highest (ca. 17%) for the copolymer network prepared from 60:40 wt. % ratio $PEG_{(6000)}DE:GGE$ (Table 2).

DMTA provided more detailed information about the polymer chain dynamics of the synthesized copolymer networks during thermal transition, where mechanical deformation takes place in a defined temperature range. DMTA shows sharp single peaks in the loss factor (FIG. 12a-c). The values, where the loss factor E" is at maximum, are attributed to the glass temperatures for the networks and are comparable with the ones obtained from DSC. The data are indicative for a homogeneous network free of crystalline PEG rich regions. Maxima of tan δ curves are attributed to the term called mechanical glass transition and deviate from the values obtained from DSC by ~10-15° C. (FIG. 11d-f). Intensity of tanδ peaks is high (>1) as an indication of good

TABLE 3

Mechanical and thermal properties of polyether networks; degree of swelling Q, glass transition temperature $T_g$, Young's Modulus E, elongation at break $\epsilon_B$.

| Sample ID[a] | Q [V·V$^{-1}$] | $T_g$, DSC (° C.) | $T_{g\ (onset)}$ (° C.) | $T_{g\ (offset)}$ (° C.) | E (MPa) | $\epsilon_B$ (%) |
|---|---|---|---|---|---|---|
| G$_{100}$ | 1.13 | 26 | 20 | 29 | 49.1 ± 5.1 | 4.7 ± 1.0 |
| G$_{80}$X$_{20}$ | 1.23 | 11 | 9 | 13 | 37.1 ± 1.6 | 6.9 ± 1.0 |
| G$_{60}$X$_{40}$ | 1.30 | −5 | −7 | −3 | 19.7 ± 0.4 | 7.6 ± 0.3 |
| G$_{40}$X$_{60}$ | 1.37 | −22 | −24 | −20 | 14.3 ± 0.2 | 11.7 ± 1.0 |
| G$_{20}$X$_{80}$ | 1.43 | −37 | −40 | −35 | 2.4 ± 0.2 | 12.8 ± 1.5 |
| G$_{80}$Y$_{20}$ | 1.27 | −9 | −14 | −6 | 34.9 ± 1.4 | 7.3 ± 0.8 |
| G$_{60}$Y$_{40}$ | 1.35 | −29 | −33 | −25 | 13.6 ± 1.1 | 9.3 ± 0.3 |
| G$_{40}$Y$_{60}$ | 1.44 | −44 | −48 | −41 | 8.0 ± 0.2 | 12.9 ± 1.7 |
| G$_{80}$Z$_{20}$ | 1.29 | −11 | −17 | −6 | 33.2 ± 1.6 | 7.4 ± 0.8 |
| G$_{60}$Z$_{40}$ | 1.37 | −30 | −35 | −26 | 12.8 ± 0.3 | 8.2 ± 0.7 |
| G$_{40}$Z$_{60}$ | 1.46 | −45 | −50 | 43 | 7.8 ± 0.1 | 16.6 ± 2.5 |

[a]G = GGE, X = $PEG_{(526)}DE$, Y = $PEG_{(2000)}DE$, Z = $PEG_{(6000)}DE$, numerical values indicate the weight fraction in %.

Gel content analysis shows for the whole series of networks a high value (min. 85%) indicating a high polymer fraction in the networks and high conversion (data not shown). Degree of swelling Q is highly dependent on the crosslinker amount in the network showing an increasing trend with the decreasing GGE amount and in the range between 1,13 (V·V$^{-1}$) to 1,46 (V·V$^{-1}$) for the networks that is composed of GGE and the one that is composed of $PEG_{(6000)}DE$ in 60 wt.% ratio.

Thermal and mechanical properties of the copolyether networks were analyzed by DSC, DMTA and tensile testings. For each network, only one single transition was observed which corresponds to the glass transition. Glass transition temperatures are all below body temperature and are variable between −45° C. and +26° C. As shown in FIG. 10 glass transition temperatures $T_g$ of the copolymer netdamping properties and shows an increasing trend with increasing PEGDE amount incorporated in the networks.

3. Cell Viability Test with Rat Mesenchymal Stem Cells

In order to determine whether extracts were cytotoxic at low doses a preliminary series of Minimum Essential Medium (MEM) extracts were taken from homopoly(glycerol glycidyl ether) films prepared by Example 1.1 (Protocol a). These extracts were added to cell culture medium in varying concentrations in a modified procedure of the ISO 10993-5 standard cytocompatibilty testing. Importantly, the amount of film used in the extractions was half that of the ISO standard (which requires 30 cm$^2$ of sample surface area for 10 ml of MEM eluent). Therefore the results are in this preliminary test reported as relative dilutions compared to the ISO standard.

3.1 Protocol
3.1.1. Test Medium Collection:
Day0: Collect the 10 ml Soaking phosphate buffered saline (PBS) of film, refill with 10 ml cell culture medium (DMEM+10% FCS).
Day1: Collect the 10 ml soaking medium and replace it with new 10 ml cell culture medium.
Day2-4: Repeat step Day1 till Day4, get medium day2, day3, day4 10 ml respectively. Finally, get 5 test mediums (I, II, III, IV, V test medium at day0, day1, day2, day3, day4 respectively)
3.1.2. Cell Viability Test: (Rat Mesenchymal Stem Cells)
Day0: Seed $1.5*10e^5$ cells in each well of 6-well plate. 20 wells should be prepared.
Day1: Discard the medium in each well including the unattached cells. Wash once with PBS. Add 3 ml fresh medium (DMEM+10% FCS) containing 60 μl, 30 μl, 15 μl, 0 μl test medium I, II, III, IV, V respectively, 0 μl for control. Till V medium.
Day2: (1) Collect all the cells including cells in the medium of each well respectively (collect the supernatant medium and the attached cells by trypsin, get cell suspension solution).
(2) Centrifuge cell suspension solution at 200 g for 10 min, discard the supernatant. Resuspend the cell pellet in 1 ml PBS.
(3) Mix 10 μl of 0.4% trypan blue and 10 μl cell suspension (dilution of cells). Allow mixture to incubate 3 min at room temperature.
(4) Count the cells number with contess (Invitrogen), count the unstained (viable) and stained (nonviable) cells separately to obtain the total number of viable cells and nonviable cells per ml of aliquot, then get the cell viability percentage. Cell viability percentage=viable cells/total cells*100%
3.2 Results
Initially, low concentrations of extractant were added to the cell culture medium (varying from 0 to 60 μL in 3 mL of cell culture medium). At these concentrations, shown in Table 4, the extract had no cytotoxic effect.

As a follow up, neat, undiluted eluent was used as cell culture medium and once again no cytotoxic effects were observed. This is shown in FIG. 13. Once again it must be stated that the amount of material used as substrate for the extraction was half that normally quoted for ISO 10993-5 standards, so this result has been quoted as a 1:2 dilution in FIG. 12, the previous results on diluted samples have also been included as 1:x dilution relative to the ISO 10993-5 standard (i.e. 60 μL=1:100 dilution, 30 μL=1:200 dilution, 15 μL=1:400 dilution). It is however promising that at this concentration no cytotoxic effects were observed.

4. Cytotoxicity Test with Fibroblast Cells
Cytotoxicity test according to ISO 10993-5 standard with L-929 fibroblast cells were conducted.
4.1. Cell Culturing
For extract production, 10 ml of cell culture medium without horse serum (EMEM, Biochrom, Germany) were put into a 15 ml tube (PP) with 20 cm$^2$ of the sample (homopoly(glycerol glycidyl ether) film prepared by Example 1.1). The sample was mixed using a rotation shaker (15 rpm, 37° C., 72 h). The resulting 72 h-extract was separated from the sample by pipetting and stored at 4° C.
L-929 (mouse fibroblasts, continuous cell line, originated from mice, ATCC) were cultured with the 72 h-extract for 48 h either in the undiluted extract or in extract dilated with cell culture medium at 1:10 and 1:100. As negative control (non cytotoxic) cells were cultured in the pure cell culture medium (EMEM). As positive controls (cytotoxic) cells were medium containing 1 mM $CuCl_2$ (for MTS assay) or 0.5 Vol.-% Triton X (for LDH release), respectively.
4.2. Results
After 48 h of cell growth, the cell morphology was assessed visually by phase contrast microscopy in transmission at magnifications of 20× and 40×, respectively. The morphology of the L929 cells after culturing them with the undiluted 72 h-extract was different to the morphology of these cells culturing them with pure cell culture medium (negative control). The morphological changes correspond to the cytotoxicity level 2 (scale ranging from 0-4) classified to a mild toxicity.
Also after 48 h of cell growth, lactate dehydrogenase LDH release in the extracellular fluid (Cytotoxicity detection KIT LDH, Roche, Germany) and the mitochondrial activity of the cells (CellTiter 96® $AQ_{ueous}$ Non-Radioactive Cell Proliferation Assay, Germany) were tested. Results are shown in FIG. 14 for the LDH-Relase (A) and for the mitochondrial activity (B). No significant change was observed for the release of extracellular LDH nor for the mitochondrial activity. This indicates that the sample did not influence the functional integrity of the outer cell membrane and had no impact on the cell activity.

Further tests showed that the to the cytotoxicity of the films could be reduced further by additional purification steps to remove cytotoxic agents. Here the films after their preparation were continuously (soxhlet) extracted with ethanol for 10 days and subsequently washed with MEM medium (3 days with changing ever 24 h). The films purified

TABLE 4

Viability of rat Mesenchymal Stem Cells after exposure to different concentrations of extracts taken from homopoly(glycerol glycidyl ether) films.

| | | | | | | | | | | | | | | | | | | | | |
|---|---|---|---|---|---|---|---|---|---|---|---|---|---|---|---|---|---|---|---|---|
| | Medium | | | | | | | | | | | | | | | | | | | |
| | Day 0 I | | | | Day 1 II | | | | Day 2 III | | | | Day 3 IV | | | | Day 4 V | | | |
| | | | | | | | | Concentration (total: 3 ml) | | | | | | | | | | | | |
| | 60 μl | 30 μl | 15 μl | 0 μl | 60 μl | 30 μl | 15 μl | 0 μl | 60 μl | 30 μl | 15 μl | 0 μl | 60 μl | 30 μl | 15 μl | 0 μl | 60 μl | 30 μl | 15 μl | 0 μl |
| Viability Percentage (%) | 88 | 88 | 89 | 89 | 85.5 | 88 | 86 | 89.5 | 91 | 87.5 | 95.5 | 86.5 | 92.5 | 93 | 87.5 | 87 | 86.5 | 90 | 87.5 | 90.5 |

The invention claimed is:

1. A method of preparing a polymer network material comprising a poly(glycidyl ether) structure, the method comprising the step of copolymerising (A) at least one multi-topic glycidyl ether comprising glycerol glycidyl ether (GGE) having the Formula I

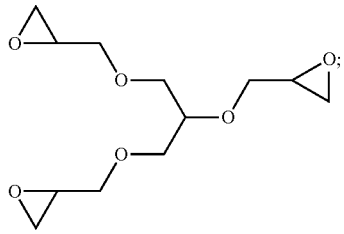

(I)

with (B) at least one glycidyl ether component, including at least one of general Formula II and general Formula IIc:

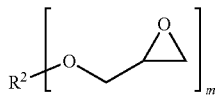

(II)

wherein
R² is a branched or unbranched C1-C10 alkyl or alkylene, a branched or unbranched C2-C10 alkenyl or alkenylene, a branched or unbranched C2-C10 alkinyl or alkinylene, a branched or unbranched C1-C10 alkyl ether or alkylene ether, a branched or unbranched C2-C10 alkenyl ether or alkenylene ether, a branched or unbranched C2-C10 alkinyl ether or alkinylene ether, and
m is 1 or 2,
or
R² is a polyether having the structure according to general Formula III

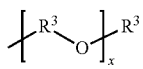

(III)

wherein R³ may be a branched or unbranched C1-C10 alkylene, a branched or unbranched C2-C10 alkenylene, a branched or unbranched C2-C10 alkinylene and x is an integer in the range of from 10 to 1,000, and m is 1;

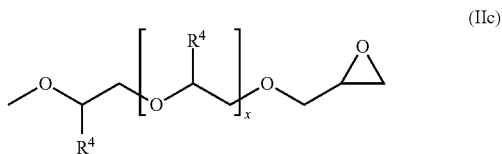

(IIc)

wherein R⁴ is hydrogen or methyl and x is an integer in the range of from 10 to 1,000,
wherein the copolymerisation step is followed by a step of functionalizing the polymer network material by covalently binding functional groups to the polymer network material.

2. The method according to claim 1, wherein the glycidyl ether component (B) is a monoglycidyl ether having the structure according general Formula IIa

(IIa)

wherein R² is methyl, ethyl, ethene, n-propyl, isopropyl, propenyl (allyl), n-butyl, iso-butyl, tert-isobutyl, n-pentyl, iso-pentyl, or phenyl.

3. The method according to claim 1, wherein the polyether group in Formula III has an average number molecular weight in the range of 100 to 50,000 g/mol.

4. The method according to claim 1, wherein the copolymerisation is conducted in the presence of particles being essentially insoluble in the reaction mixture, and the copolymerisation step is followed by a step of extracting the particles by dissolving them with a solvent giving rise to a porous scaffold of the polymer network material having a pore size being defined by the particle size.

5. A polymer network material comprising a poly(glycidyl ether) structure obtained by the method according to claim 1.

6. The method according to claim 1, wherein the step of copolymerising comprises ring-opening polymerisation.

7. A medical or biomedical article prepared from the polymer network material of claim 5.

8. The method according to claim 6, wherein the ring-opening polymerisation is cationically initiated.

9. The method according to claim 8, wherein the ring-opening polymerisation is cationically initiated by using a photoinitiator, a Lewis acid or a Bronsted acid.

* * * * *